(12) United States Patent
Otaka et al.

(10) Patent No.: US 8,583,863 B2
(45) Date of Patent: Nov. 12, 2013

(54) STORAGE SYSTEM

(75) Inventors: Atsuhiro Otaka, Kawasaki (JP); Oumar Thielo, Kawasaki (JP); Nobuyuki Honjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 404 days.

(21) Appl. No.: 12/971,488

(22) Filed: Dec. 17, 2010

(65) Prior Publication Data

US 2011/0320708 A1 Dec. 29, 2011

(30) Foreign Application Priority Data

Dec. 21, 2009 (JP) ................................. 2009-289521

(51) Int. Cl.
  *G06F 12/00* (2006.01)
  *G06F 13/00* (2006.01)
  *G06F 13/28* (2006.01)
  *G06F 3/00* (2006.01)

(52) U.S. Cl.
  USPC .............. 711/112; 711/154; 710/10; 710/300

(58) Field of Classification Search
  USPC ............. 711/111–112, 114, 154; 710/10, 300
  See application file for complete search history.

(56) References Cited

U.S. PATENT DOCUMENTS

| | | | |
|---|---|---|---|
| 7,890,794 B1* | 2/2011 | Gasser | 714/5.1 |
| 2007/0070885 A1* | 3/2007 | Uddenberg et al. | 370/225 |
| 2008/0195766 A1* | 8/2008 | Suzuki | 710/10 |
| 2009/0003197 A1* | 1/2009 | Jones | 370/221 |
| 2010/0064086 A1* | 3/2010 | McCarty et al. | 710/300 |
| 2011/0185226 A1* | 7/2011 | Douchi et al. | 714/6.22 |
| 2011/0283150 A1* | 11/2011 | Konishi et al. | 714/42 |

FOREIGN PATENT DOCUMENTS

JP 2008-197780 A 8/2008

* cited by examiner

*Primary Examiner* — Ryan Bertram
(74) *Attorney, Agent, or Firm* — Fujitsu Patent Center

(57) ABSTRACT

A storage expander apparatus for accessing storage units includes first interfaces for accessing the storage units, a second interface for accessing subordinate expander apparatus, and a processor for executing receiving from an external apparatus a first request for obtaining first information indicative of a state of a connection of the storage expander apparatus, transmitting a second request for obtaining second information indicative of a state of a connection of the subordinate expander apparatus, measuring an elapsing time that has elapsed since transmitting the second request, storing a first response corresponding to the second request upon receiving the first response, starting a process for obtaining third information indicative of a state of a connection to be connected with the first interfaces upon the elapsing time exceeding a predetermined time, and transmitting a second response including the third information to the external apparatus upon receiving the third response.

15 Claims, 27 Drawing Sheets

FIG. 3

| PHY STATE TABLE | | T1 |
|---|---|---|
| | PHY ID | PHY STATE |
| | 0 | NORMAL STATE |
| | 1 | DISCOVERY STANDBY |
| | : | : |
| SELF-CONFIGURING FLAG | 1 | SELF-CONFIGURING STATE |

T1-1
T1-2

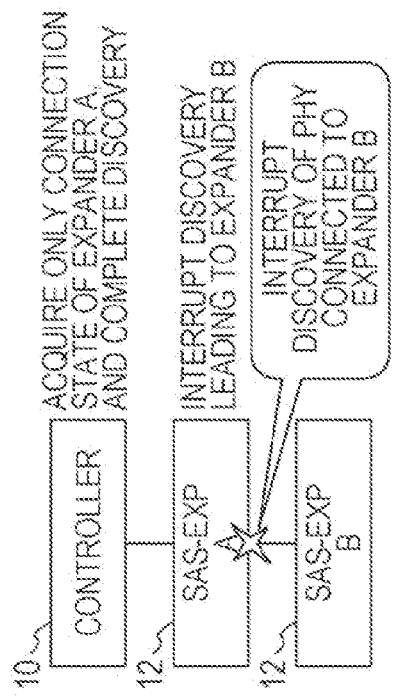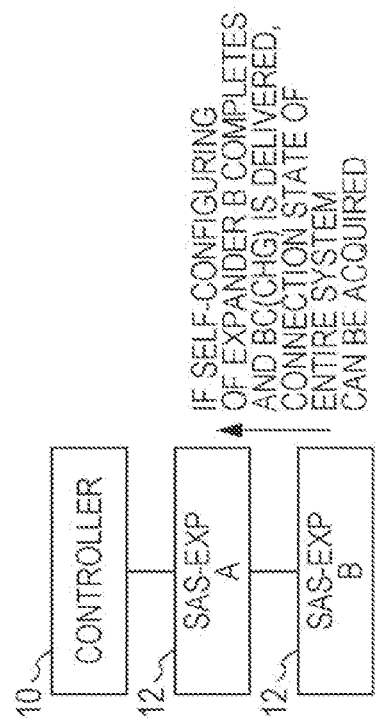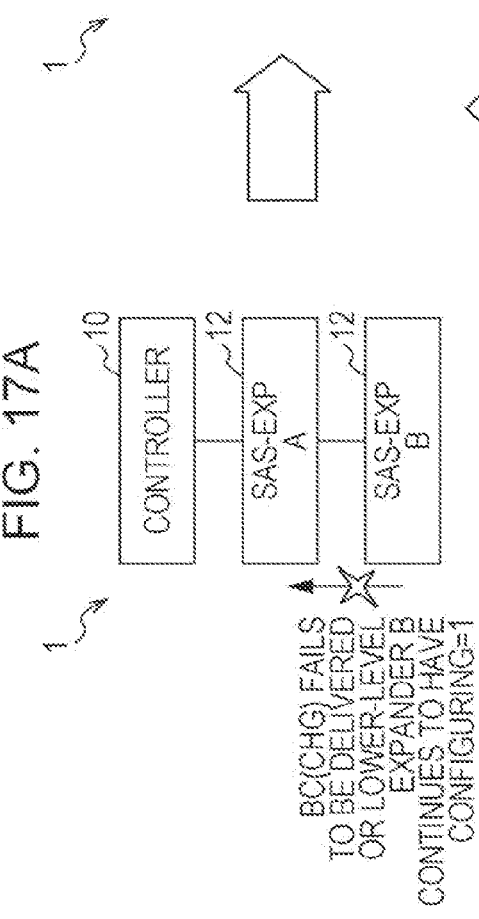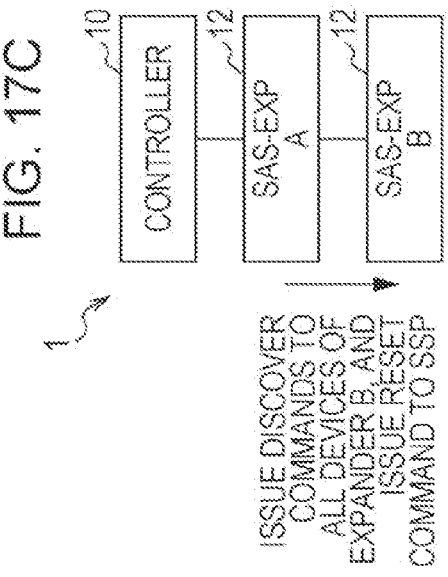

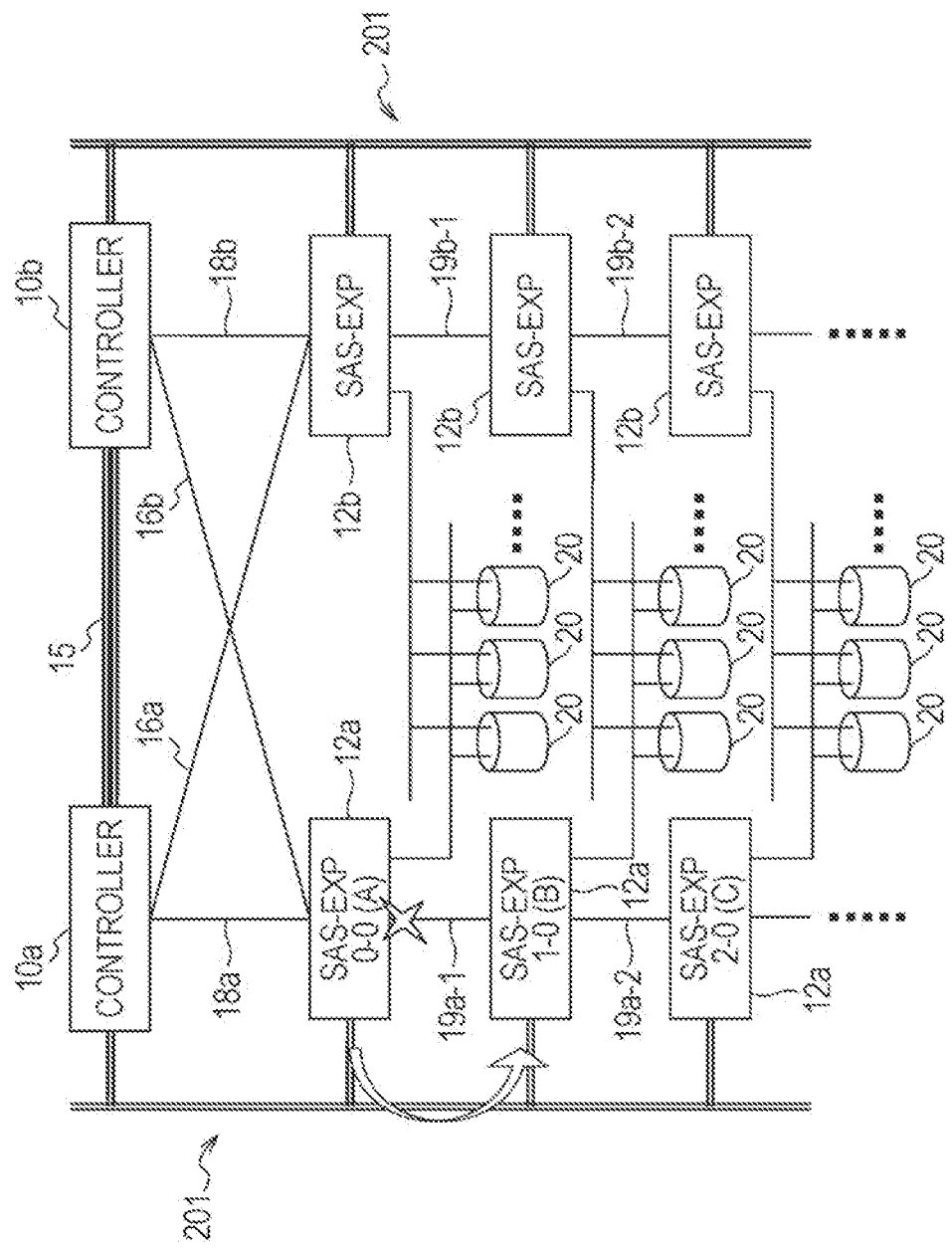

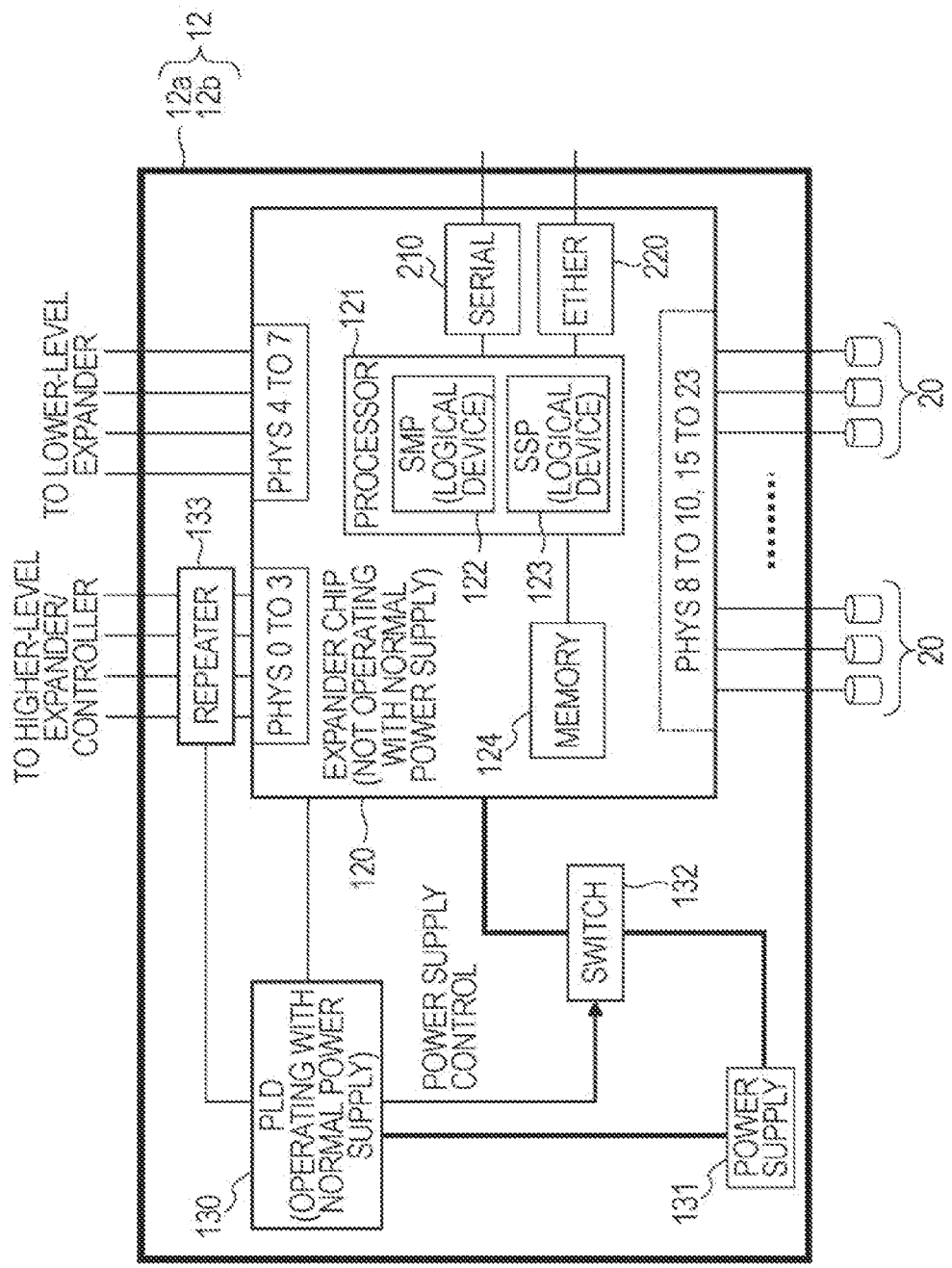

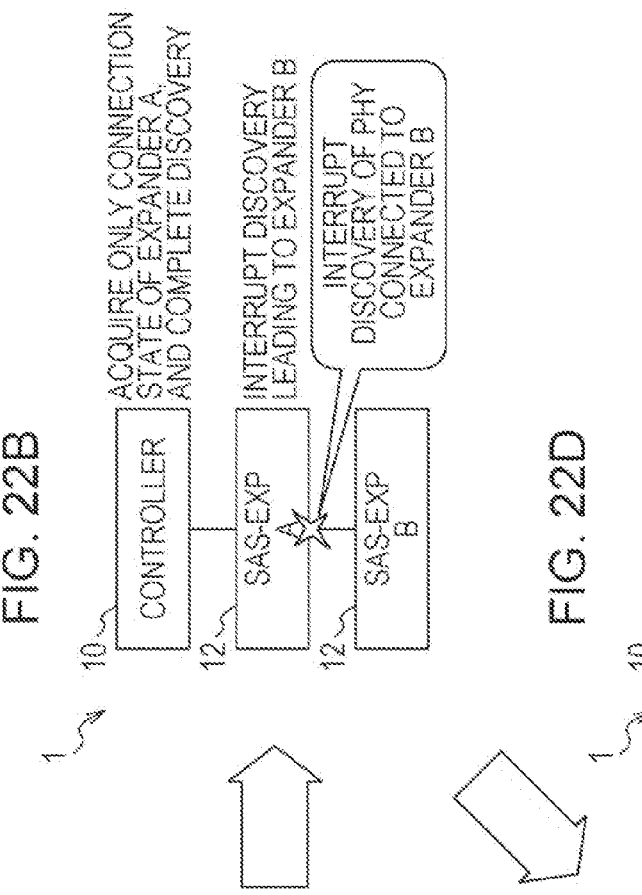
FIG. 22B
FIG. 22A
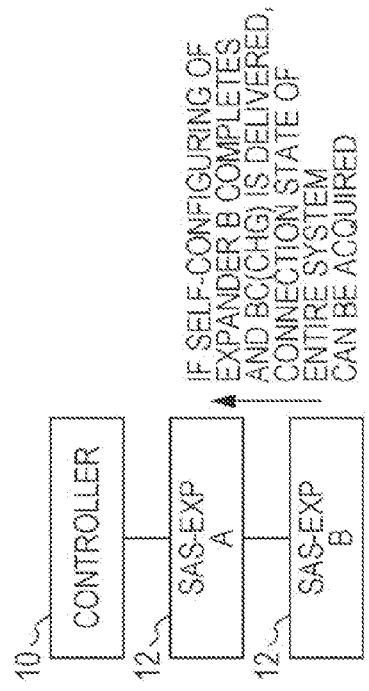
FIG. 22D
FIG. 22C
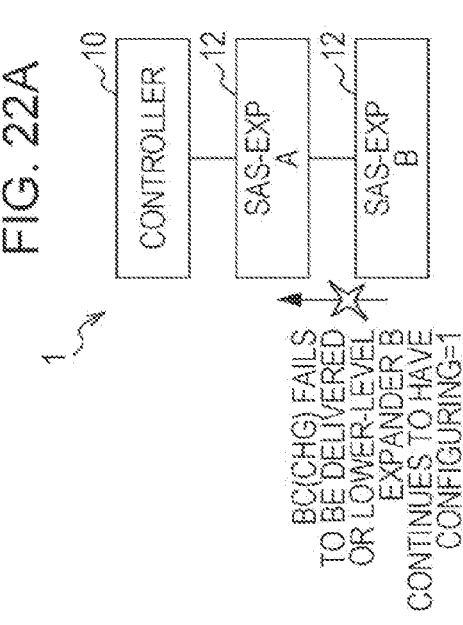
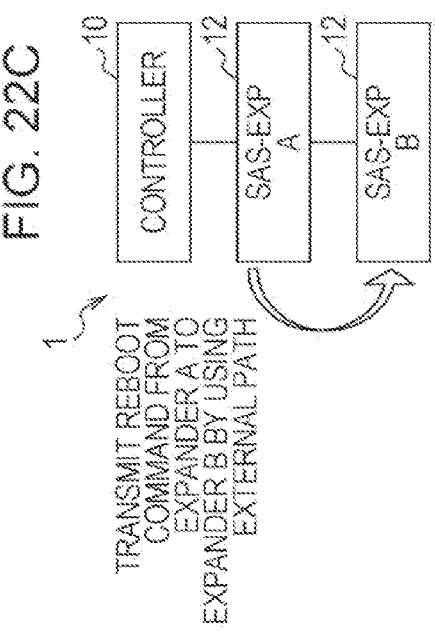

FIG. 23

| PHY STATE TABLE | PHY ID | PHY STATE |
|---|---|---|
| | 0 | NORMAL STATE |
| | 1 | DISCOVERY STANDBY |
| | 2 | ABNORMAL STATE (DURING RECOVERY) |
| | : | : |
| SELF-CONFIGURING FLAG | 1 | SELF-CONFIGURING STATE |

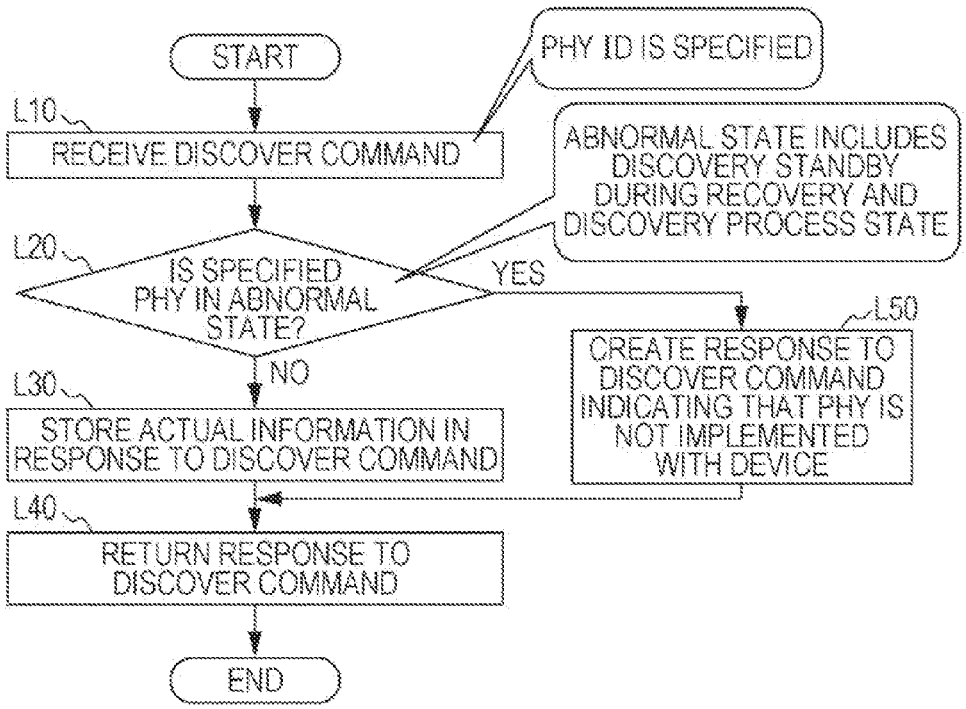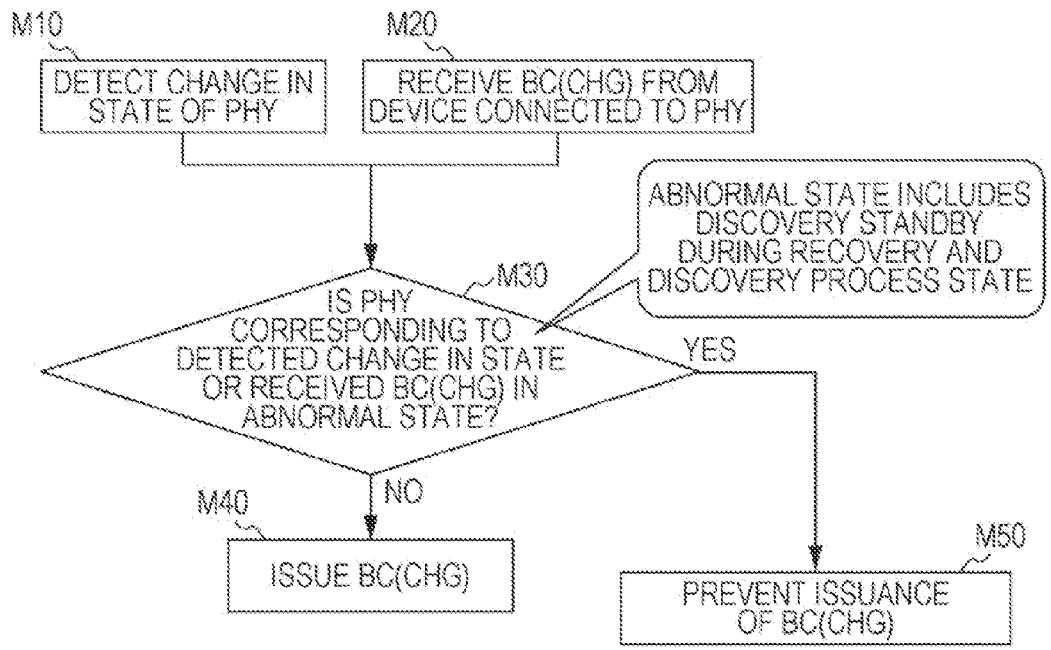

US 8,583,863 B2

STORAGE SYSTEM

CROSS-REFERENCE TO RELATED APPLICATION

This application is based upon and claims the benefit of priority of the prior Japanese Patent Application No. 2009-289521, filed on Dec. 21, 2009 the entire contents of which are incorporated herein by reference.

FIELD

The embodiments discussed herein are related to a technique of managing configuration information in a storage system.

BACKGROUND

FIG. 29 is a diagram schematically illustrating a configuration of a storage system.

A storage system 900 illustrated in this FIG. 29 is, for example, a RAID (Redundant Arrays of Inexpensive Disks) system including a plurality of storage devices arranged in an array, and is connected to a host computer 901, which is a higher-level device.

The storage system 900 performs processing, such as data reading or writing, on a storage device (illustration thereof is omitted) in accordance with an input/output request (e.g., read command or write command) from the host computer 901.

As illustrated in FIG. 29, the storage system 900 is configured to include a CE (Controller Enclosure) #000 and a plurality (two in the example illustrated in FIG. 29) of DEs (Disk Enclosures) #001 and #002. Further, the DEs #001 and #002 are cascade-connected (multistage-connected) in series to the CE #000. That is, as illustrated in FIG. 29, the CE #000 is connected to the DE #001, and the DE #001 is connected to the DE #002.

The CE #000 stores one or more (two in the example illustrated in FIG. 29) CMs (Controller Modules) #00 and #01. The CMs #00 and #01 perform a variety of controls in the storage system 900, and perform access control to each of storage devices provided to SAS expanders 802a, 802b, 803a, 803b, 804a, and 804b on the basis of an I/O (Input/Output) command transmitted from the host computer 901.

The CM #00 includes a controller 801a and the SAS (Serial Attached SCSI (Small Computer System Interface)) expander (EXP) 802a, and the CM #01 includes a controller 801b and the SAS expander 802b.

The controllers 801a and 801b perform a variety of controls in the CMs #00 and #01, respectively. Further, in the CM #00, the controller 801a is connected to the SAS expander 802a via a data bus 811a, and is connected to the SAS expander 802b of the CM #01 via a data bus 812a.

Similarly, in the CM #01, the controller 801b is connected to the SAS expander 802b via a data bus 811b, and is connected to the SAS expander 802a of the CM #00 via a data bus 812b.

The SAS expanders 802a and 802b are connected to one or more common storage devices (illustration thereof is omitted), and perform access control to the storage devices on the basis of disk access commands transmitted from the controllers 801a and 801b. With each of the SAS expanders 802a and 802b connected to the one or more storage devices, the access path to the storage devices is duplicated.

The DE #001 is configured to include not-illustrated one or more storage devices and the SAS expanders 803a and 803b. With each of the SAS expanders 803a and 803b connected to the one or more storage devices, the access path to the storage devices is duplicated.

Similarly, the DE #002 is configured to include not-illustrated one or more storage devices and the SAS expanders 804a and 804b. With each of the SAS expanders 804a and 804b connected to the one or more storage devices, the access path to the storage devices is duplicated.

The SAS expanders 803a, 803b, 804a, and 804b perform access control to the storage devices on the basis of disk access commands transmitted from the controllers 801a and 801b.

Further, the SAS expander 803a of the DE #001 is connected to the SAS expander 802a of the CE #000 via a data path 813a-1. Further, the SAS expander 804a of the DE #002 is connected to the SAS expander 803a of the DE #001 via a data path 813a-2.

Similarly, the SAS expander 803b of the DE #001 is connected to the SAS expander 802b of the CE #000 via a data path 813b-1. Further, the SAS expander 804b of the DE #002 is connected to the SAS expander 803b of the DE #001 via a data path 813b-2.

That is, the SAS expanders 802a, 803a, and 804a are cascade-connected in series to the controller 801a. In other words, as illustrated in FIG. 29, the controller 801a is connected to the SAS expander 802a, and the SAS expander 802a is connected to the SAS expander 803a. Further, the SAS expander 803a is connected to the SAS expander 804a. Similarly, the SAS expanders 802b, 803b, and 804b are cascade-connected in series to the controller 801b. That is, the controller 801b is connected to the SAS expander 802b, and the SAS expander 802b is connected to the SAS expander 803b. Further, the SAS expander 803b is connected to the SAS expander 804b.

In the drawing, reference numerals attached with letters a and b indicate that there is a corresponding relationship between components designated by reference numerals attached with the same letter. For example, in the above-described configuration, the SAS expanders 803a and 804a are cascade-connected to the SAS expander 802a. Similarly, the SAS expanders 803b and 804b are cascade-connected to the SAS expander 802b. In the following, reference numerals attached with the same letter a or b will indicate that the components designated thereby have a mutually corresponding relationship.

Further, in the components with the above-described reference numerals attached with the letters a and b, if a component with a reference numeral attached with the letter a and a component with a reference numeral attached with the letter b have no difference in configuration and function, the components may be hereinafter designated by a reference numeral with the letters a and b omitted for the sake of convenience. For example, the SAS expanders 802a and 802b have the same configuration and the same function. In the following, therefore, the SAS expander 802 will represent the SAS expander designated by the reference numeral 802a or 802b. Similarly, the SAS expander 803 will represent the SAS expander designated by the reference numeral 803a or 803b. Further, the SAS expander 804 will represent the SAS expander designated by the reference numeral 804a or 804b.

Further, in the data path from the controller 801 to the SAS expander 804, the side of the host computer 901, i.e., the side of the controller 801 may be hereinafter referred to as the upstream side or the higher level.

As the configuration management method performed in a storage system using SAS expanders for backend connection, as described above, a method is known in which the expanders issue an information frame called BROADCAST (CHANGE) (hereinafter referred to as BC(CHG)) upon detection of a change in configuration.

In the existing storage system 900 as described above, upon detection of a change in configuration, each of the SAS expanders 802 to 804 issues the BC(CHG) and notifies the upstream-side controller 801 of the detection. Thereby, notification to the higher level and reconstruction of the configuration are performed in the event of a change in configuration.

Further, the controller 801 and the SAS expanders 802 to 804 are capable of finding the respective connection states of devices subordinate thereto through a discovery process (see Japanese Laid-open Patent Publication No. 2008-197780, for example).

The discovery process is performed to allow the controller 801 and so forth to find the connection states of the subordinate devices when a change in state is detected in any of the SAS expanders. Specifically, the discovery process is performed with commands, such as REPORT GENERAL and REPORT ROUTE INFORMATION, transmitted from the higher-level SAS expanders 802 and 803 to the lower-level SAS expanders 803 and 804. The lower-level SAS expanders 803 and 804 transmit, as the responses to the above commands, the number of PHYs (PHYsical links) included therein and the information of the devices connected to the PHYs.

The controller 801 manages the information of the subordinate devices by using the information transmitted from the downstream-side SAS expanders.

In this type of storage system, however, if one of the plurality of cascade-connected SAS expanders is performing the discovery process, the SAS expander(s) and the controller higher than the SAS expander are unable to proceed with the discovery process. The state in which a SAS expander is performing the discovery process may be hereinafter referred to as the self-configuring state.

FIGS. 30 to 34 are diagrams for explaining processing performed when abnormality occurs during the discovery process in the existing storage system. For the sake of convenience, these FIGS. 30 to 34 illustrate one controller 801 and SAS expanders 802 to 804 cascade-connected thereto. Further, these FIGS. 30 to 34 illustrate, among the plurality of storage devices provided to the storage system 900, only one storage device 810 connected to the SAS expander 804.

In the storage system 900, if the SAS expander 804 detects a change (change in state) in the topology managed thereby, as illustrated in FIG. 30, for example, the SAS expander 804 transmits (issues) the BC(CHG) to the higher-level SAS expander 803, without performing the discovery process.

Further, the SAS expander 803 having received the BC(CHG) from the SAS expander 804 transfers the BC(CHG) to the further higher-level SAS expander 802, and the SAS expander 802 transfers the BC(CHG) to the further higher-level controller 801.

Each of the controller 801 and the SAS expanders 802 and 803 having received the BC(CHG) starts the discovery process, as illustrated in FIG. 31. Accordingly, the SAS expanders 802 and 803 shift to the self-configuring state.

The controller 801 and the SAS expanders 802 and 803 are unable to proceed with the discovery process when the subordinate SAS expanders 803 and 804 are in the discovery process state (discovery state) (self-configuring state), and thus shift to the standby state (discovery standby state, self-configuring state) (see FIG. 32).

That is, for example, the SAS expander 802 or 803 starts the discovery process after the subordinate SAS expander 803 or 804 has completed the discovery process (self-configuring) and transmitted the BC(CHG).

As illustrated in FIG. 33, however, the discovery process fails to complete in some cases, owing to some abnormality occurring in the SAS expander 803, for example. If the discovery process thus fails to complete in the SAS expander 803, the BC(CHG) is not issued from the SAS expander 803. Consequently, the higher-level SAS expander 802 is unable to receive the BC(CHG) and fails to complete the discovery process, remaining in the discovery standby state.

Further, even if the discovery process completes in the SAS expander 803, transmission path abnormality may occur in the transmission path 813-1, and thus the SAS expander 802 may be unable to receive the BC(CHG), as illustrated in FIG. 34. Similarly, even if the discovery process completes in the SAS expander 803, the SAS expander 802 is unable to receive the BC(CHG) if some abnormality occurs in the SAS expander 803 or 802, as illustrated in FIG. 34. If the SAS expander 802 thus fails to receive the BC(CHG), the SAS expander 802 and the controller 801 remain in the discovery standby state, and the discovery process is not completed.

That is, an issue arises in that the SAS expander 802 and the controller 801 remain in the self-configuring state and are unable to grasp the connection states of the devices subordinate thereto. In this case, the storage system 900 continues to operate while the SAS expander 802 and the controller 801 remain in the self-configuring state, and eventually the CMs are degraded, for example.

An object of the present case, which has been conceived in view of the above-described issue, is to allow, even if a storage device connection device does not return a response to an information acquisition request, a higher-level storage device connection device to continue to perform information gathering.

Objects of the present case are not limited to the above-described object. To provide an operational advantage which is derived from respective configurations illustrated in the later-described DESCRIPTION OF EMBODIMENTS, and which is not obtainable from existing techniques can also be regarded as one of the other objects of the present case.

According to a storage device connection device, a storage device, an information management method, and an information management program disclosed herein, at least one of the following effects or advantages is obtained.

(1) The state of standby for the completion of an information gathering process is cancelled to allow the completion of the information gathering process. It is thereby possible to perform the information gathering process also in a higher-level device.

(2) A storage device connection device with an uncompleted information gathering process is rebooted, and thereby is recovered from the state of information gathering process abnormality. It is thereby possible to stably operate the storage device connection device and a device connected thereto.

SUMMARY

According to an aspect of the invention, a storage expander apparatus for accessing a plurality of storage units including a plurality of first interfaces for accessing the plurality of storage units, a second interfaceb for accessing subordinate expander apparatus, and a processor for executing receiving from an external apparatus a first request for obtaining first information indicative of a state of a connection to be connected with the plurality of first interfaces and the second interface, transmitting a second request for obtaining second information indicative of a state of a connection of the subordinate expander apparatus, measuring an elapsing time that has elapsed since transmitting the second request, storing a first response corresponding to the second request upon receiving the first response, starting a process for obtaining third information indicative of a state of a connection to be connected with the plurality of first interfaces upon the elapsing time exceeding a predetermined time, and transmitting a second response including the third information to the external apparatus upon receiving the third response.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a state management table as an example of embodiment;

FIGS. 17A to 17D are diagrams for explaining a SAS expander recovery method using an SES command performed in the storage system as an example of embodiment;

FIG. 20 is a diagram schematically exemplifying a configuration of the storage system as an example of embodiment, which is capable of achieving a recovery method using an external path;

FIG. 21 is a diagram schematically illustrating a hardware configuration of a SAS expander of the storage system as an example of embodiment;

FIGS. 22A to 22D are diagrams for explaining a SAS expander recovery method using an external path performed in the storage system as an example of embodiment;

FIG. 23 is a diagram illustrating another example of the state management table as an example of embodiment;

FIG. 24 is a flowchart for explaining a method of responding to a DISCOVER command performed by a SAS expander in the storage system as an example of embodiment;

FIG. 25 is a flowchart for explaining a BC(CHG) issuance method performed by a SAS expander in the storage system as an example of embodiment;

DESCRIPTION OF EMBODIMENTS

Embodiments will be described below with reference to the drawings.

Figure 1:
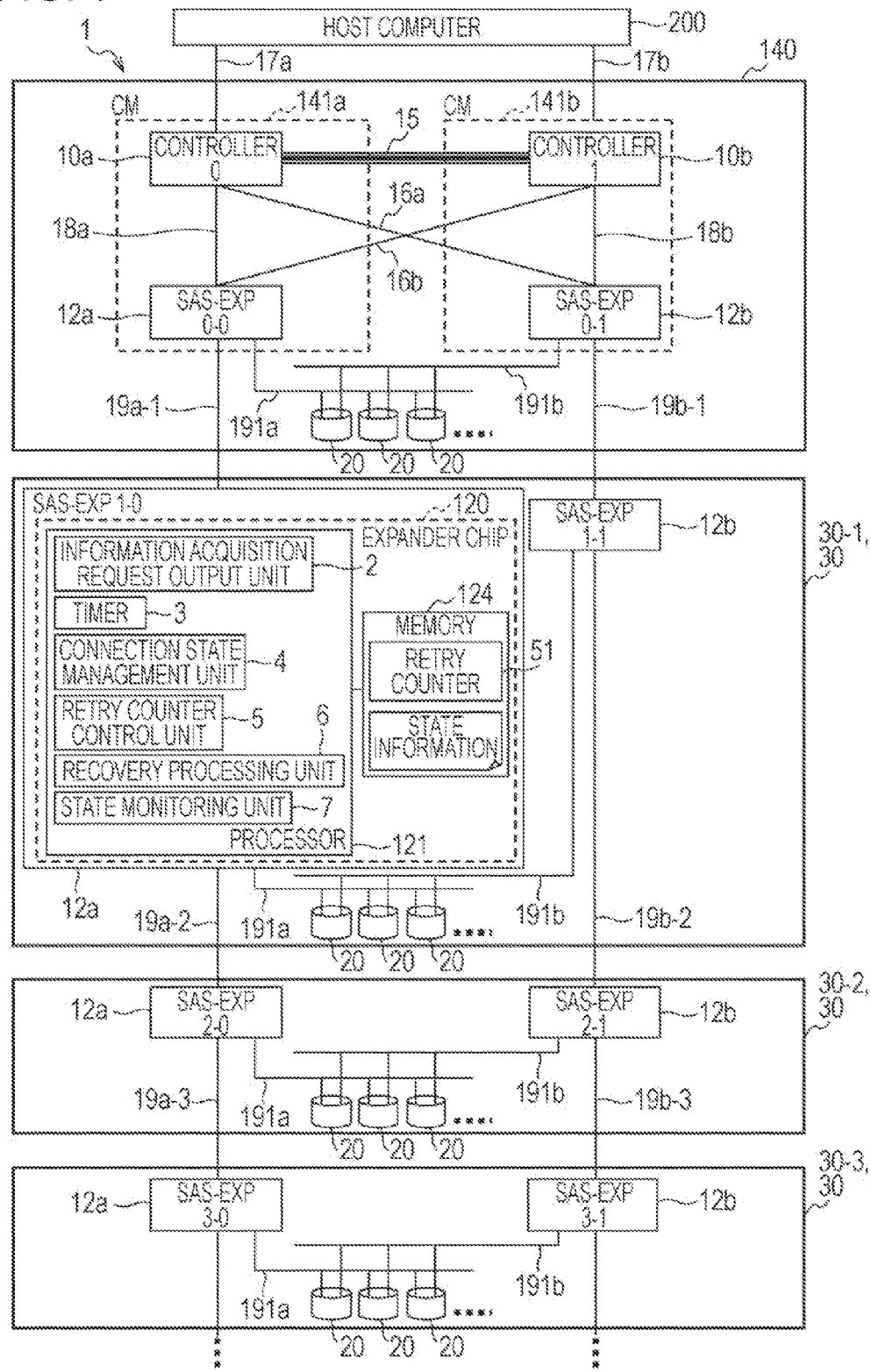
FIG. 1 is a diagram schematically illustrating a functional configuration of a storage system as an example of embodiment.
Figure 2:
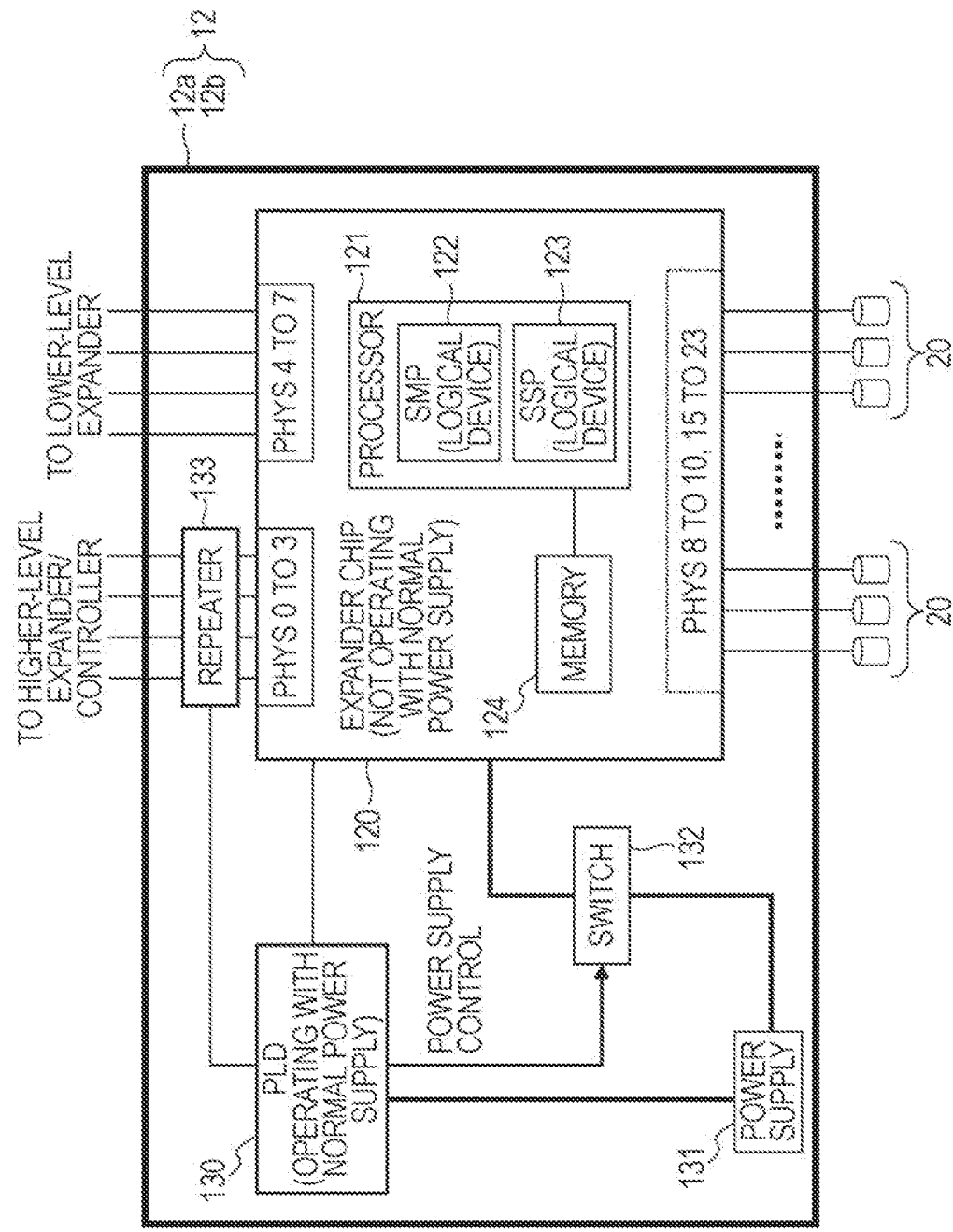
FIG. 2 is a diagram illustrating an example of the hardware configuration of a SAS expander as an example of embodiment.

FIG. 1 is a diagram schematically illustrating a functional configuration of a storage system 1 as an example of embodiment, and FIG. 2 is a diagram illustrating an example of the hardware configuration of a SAS expander 12 in the storage system 1.

The present storage system (storage device) 1 is, for example, a RAID system including a plurality of storage devices 20 arranged in an array, and is connected to a host computer 200, which is a higher-level device, as illustrated in FIG. 1.

The storage system 1 performs processing, such as data reading or writing, on the storage devices 20 in accordance with an input/output request (e.g., read command or write command) from the host computer 200. The input/output request from the host computer 200 may be referred to as the host I/O command.

As illustrated in FIG. 1, the present storage system 1 includes a CE (Controller Enclosure) 140 and a plurality (three in the example illustrated in FIG. 1) of DEs (Device Enclosures) 30-1, 30-2, and 30-3.

The DEs 30-1, 30-2, and 30-3 have a substantially similar configuration. In the following, if one of the plurality of DEs needs to be identified, the reference numeral 30-1, 30-2, or 30-3 will be used as the reference numeral designating the DE. Meanwhile, a reference numeral 30 will be used to designate an arbitrary one of the DEs.

Each of the CE 140 and the DEs 30 includes one or more (three in the example illustrated in FIGS. 1 and 2) storage devices 20, and provides the storage areas of the storage devices 20 to the present storage system 1.

Each of the storage devices 20, which readably stores a variety of data, programs, and so forth, is an HDD (Hard Disk Drive), for example. In the present storage system 1, the plurality of storage devices 20 are arranged in an array to form a RAID system.

Various storage devices can be used as the storage devices 20. In the present embodiment, description will be made of an example in which SAS disks connected on the basis of the SAS (Serial Attached SCSI) standard are used as the storage devices 20.

As illustrated in FIG. 1, the CE 140 includes a plurality (two in the example illustrated in FIG. 1) of CMs 141a and 141b and one or more (three in the example illustrated in FIGS. 1 and 2) storage devices 20.

The CMs 141a and 141b perform a variety of controls in the present storage system 1. The CM 141a includes a controller 10a and a SAS expander (SAS-EXP) 12a. Further, the CM 141b includes a controller 10b and a SAS expander 12b.

The controllers 10a and 10b have a substantially similar configuration. Further, the SAS expanders 12a and 12b have a substantially similar configuration.

That is, the CMs 141a and 141b have substantially similar function and configuration. If one of the plurality of CMs needs to be identified, the reference numeral 141a or 141b will be hereinafter used as the reference numeral designating the CM. Meanwhile, a reference numeral 141 will be used to designate an arbitrary one of the CMs. Similarly, if one of the plurality of SAS expanders needs to be identified, the reference numeral 12a or 12b will be hereinafter used as the reference numeral designating the SAS expander. Meanwhile, a reference numeral 12 will be used to designate an arbitrary one of the SAS expanders. Further, if one of the plurality of controllers needs to be identified, the reference numeral 10a or 10b will be hereinafter used as the reference numeral designating the controller. Meanwhile, a reference numeral 10 will be used to designate an arbitrary one of the controllers.

The controller 10 performs a variety of controls in the CM 141a or 141b, and functions as an access control unit which performs access control to the plurality of storage devices 20.

On the basis of the host I/O command transmitted from the host computer 200, the controller 10 generates a disk access command to each of the storage devices 20 provided to the present storage system 1.

Then, the controller 10 transmits the disk access command to the SAS expanders 12a and 12b corresponding to the target storage device 20.

Further, the controller 10a is connected to the SAS expander 12a via a data bus 18a, and is connected to the SAS expander 12b of the CM 141b via a data bus 16a.

Similarly, the controller 10b is connected to the SAS expander 12b via a data bus 18b, and is connected to the SAS expander 12a of the CM 141a via a data bus 16b.

That is, in the CE 140, the controller 10a is connected to the SAS expander 12b of the other CM 141b, and the controller 10b is connected to the SAS expander 12a of the other CM 141a (cross connection).

Accordingly, the controller 10a is connected to the SAS expander 12a included in the same CM 141a including the controller 10a, and is connected to the SAS expander 12b included in the other CM 141b. Similarly, the controller 10b is connected to the SAS expander 12b included in the same CM 141b including the controller 10b, and is connected to the SAS expander 12a included in the other CM 141a.

In the following, a path connecting the controller 10 and the SAS expander 12a or 12b via the data bus 18a or 18b may be referred to as the straight line.

Further, the controllers 10a and 10b are communicably connected via a data path 15. The data path 15 is based on, for example, the PCI (Peripheral Component Interconnect) Express standard. Further, the data buses 18a, 18b, 19a-1, 19b-1, 19a-2, 19b-2, 19a-3, and 19b-3 are based on, for example, the SAS interface standard.

The DE 30 includes a plurality (three in the example illustrated in FIG. 1) of storage devices 20, and usably provides the storage areas of the storage devices 20. As illustrated in FIG. 1, the DE 30 includes the SAS expanders 12a and 12b and the storage devices 20.

The SAS expanders 12a and 12b are connected to one or more common storage devices 20, and perform access control to the storage devices 20 on the basis of the disk access command transmitted from the controller 10. That is, the SAS expander 12 functions as a storage device connection unit (storage device connection device) connected to the plurality of storage devices 20.

The SAS expanders 12a and 12b are connected to one or more (three in the example illustrated in FIG. 1) common storage devices 20, and data can be written in and read from the storage devices 20 through both of the SAS expanders 12a and 12b.

In the example illustrated in FIG. 1, the SAS expander 12a is connected to the storage devices 20 via a data bus 191a, and the SAS expander 12b is connected to the storage devices 20 via a data bus 191b.

That is, with each of the SAS expanders 12a and 12b connected to the one or more storage devices 20, the access path to the storage devices 20 is duplicated.

The controllers 10a and 10b may be hereinafter represented as the controllers 0 and 1, respectively. Further, the SAS expanders 12a and 12b stored in the CE 140 may be hereinafter represented as the SAS expanders 0-0 and 0-1, respectively.

Similarly, the SAS expanders 12a and 12b stored in the DE 30-1 may be hereinafter represented as the SAS expanders 1-0 and 1-1, respectively. Further, the SAS expanders 12a and 12b stored in the DE 30-2 may be hereinafter represented as the SAS expanders 2-0 and 2-1, respectively. Further, the SAS expanders 12a and 12b stored in the DE 30-3 may be hereinafter represented as the SAS expanders 3-0 and 3-1, respectively.

For the sake of convenience, in the present storage system 1, the side of the host computer 200 which transmits the host I/O command will be hereinafter referred to as the upstream side or the higher level, and the side of the destination of the disk access command created on the basis of the host I/O command will be hereinafter referred to as the downstream side or the lower level. Further, a device connected at the lower level may be hereinafter referred to as a subordinate device.

Further, in the example illustrated in FIG. 1, when the side of the controller 10a is viewed as the upstream side, a path of a series of straight lines connecting the SAS expanders 0-0, 1-0, 2-0, and 3-0 may be represented as the 0-system. Similarly, when the side of the controller 10b is viewed as the upstream side, a path of a series of straight lines connecting the SAS expanders 0-1, 1-1, 2-1, and 3-1 may be represented as the 1-system.

As illustrated in FIG. 2, the SAS expander 12 includes an expander chip 120, a PLD (Programmable Logic Device) 130, a power supply 131, a switch 132, and a repeater 133.

The expander chip 120 realizes respective functions of the SAS expander 12, and operates with emergency power supplied from the power supply 131. As illustrated in FIG. 2, the expander chip 120 includes a processor 121, a memory 124, and PHYs (PHYsical link ports).

A PHY is a physical link port. The example illustrated in FIG. 2 includes twenty-four PHYs 0 to 23. Further, in the example illustrated in this FIG. 2, PHYs 0 to 3 are used for the connection to the higher-level SAS expander 12 and the controller 10, and are connected to the higher-level SAS expander 12 and the controller 10 via the repeater 133. Further, PHYs 4 to 7 are used for the connection to the lower-level SAS expander 12, and PHYs 8 to 10 and 15 to 23 are used for the connection to the storage devices 20.

The repeater 133 is connected to an IN/OUT interface of the SAS expander 12, and performs signal amplification in a unit input/output unit (illustration thereof is omitted). Further, the repeater 133 has a function of notifying, upon detection of link-up of PHYs (PHYs 0 to 3 in the example illustrated in FIG. 2), the PLD 130 of the detection.

The power supply 131 supplies power to the respective sections of the SAS expander 12. Further, the power supply 131 supplies normal power to the PLD 130 (normal power supply), and supplies emergency power to the expander chip 120 via the switch 132 (emergency power supply).

The switch 132 switches between ON and OFF of power supply from the power supply 131 to the expander chip 120. On the basis of the control from the PLD 130, the switch 132 selectively switches between ON and OFF of power supply from the power supply 131 to the expander chip 120.

The PLD 130 is a device operating with the normal power supply, and performs, for example, power supply control of the SAS expander 12. If the repeater 133 detects link-up (detailed description thereof will be made later), for example, the PLD 130 transmits a power supply control signal to the switch 132, to thereby turn ON the switch 132 (emergency power supply) and operate the expander chip 120.

The memory 124, which stores a variety of data and programs, temporarily stores (extracts) data and programs when the processor 121 performs a variety of operations and controls. The memory 124 further stores a state management table T1 illustrated in FIG. 3.

FIG. 3 is a diagram illustrating an example of the state management table T1 as an example of embodiment. The state management table T1 represents the state of the SAS expander 12 provided with the expander chip 120 and the states of devices connected to the SAS expander 12 (the states of PHYs), and is updated by a state monitoring unit 7 described later. As illustrated in FIG. 3, the state management table T1 includes a PHY state table section T1-1 and a self-configuring flag section T1-2.

The PHY state table section T1-1, which stores the respective states of the PHYs (PHY states), registers (stores) the PHY states in association with PHY IDs (IDentifiers) for identifying the PHYs. The PHY state refers to state information representing the state of a device connected to a PHY. For example, information representing the state of a device, such as "normal state," "discovery standby," or "abnormal state (during recovery)," is stored. That is, the memory 24 functions as a state information storage unit for recording the information of another SAS expander 12 in association with the state information representing the state of the another SAS expander 12.

The self-configuring flag section T1-2 stores the information indicating whether or not the SAS expander 12 is in the discovery process (self-configuring) state (self-configuring state). For example, if the SAS expander 12 is in the self-configuring state, the self-configuring flag section T1-2 stores a value "1."

The processor 121 is an arithmetic device which performs a variety of operations and controls by executing programs, and realizes a variety of functions by executing programs stored in the memory 124 and a not-illustrated ROM (Read-Only Memory). As illustrated in FIG. 2, the processor 121 includes an SMP 122 and an SSP 123. The SMP 122 is a logical device based on the SMP (Serial Management Protocol), and the SSP 123 is a logical device based on the SSP (Serial SCSI Protocol).

Further, the processor 121 executes an information management program stored in a not-illustrated ROM (Read-Only Memory) or storage device, to thereby function as an information acquisition request output unit 2, a timer 3, a connection state management unit 4, a retry counter control unit 5, a recovery processing unit 6, and the state monitoring unit 7.

The program for realizing the functions of the information acquisition request output unit 2, the timer 3, the connection state management unit 4, the retry counter control unit 5, the recovery processing unit 6, and the state monitoring unit 7 (information management program) is provided as recorded in a computer-readable recording medium, such as a flexible disk, a CD (Compact Disc) including a CD-ROM, a CD-R (Recordable), and a CD-RW (ReWritable), a DVD (Digital Versatile Disc) including a DVD-ROM, a DVD-RAM (Random Access Memory), a DVD-R, a DVD+R, a DVD-RW, a DVD+RW, and an HD (High-Definition) DVD, a Blu-ray disc, a magnetic disk, an optical disk, or a magneto-optical disk, for example. Further, a computer uses the program by reading the program from the recording medium and transferring and storing the program into an internal or external storage device. Alternatively, the program may be recorded in a storage device (recording medium), such as a magnetic disk, an optical disk, or a magneto-optical disk, for example, and may be provided from the recording device to a computer via a communication path.

To realize the functions of the information acquisition request output unit 2, the timer 3, the connection state management unit 4, the retry counter control unit 5, the recovery processing unit 6, and the state monitoring unit 7, a program stored in an internal storage device (not-illustrated ROM or storage device in the present embodiment) is executed by a microprocessor of a computer (the processor 121 in the present embodiment). In this case, the program recorded in a recording medium may be read and executed by a computer.

In the present embodiment, a computer is a concept including hardware and an operating system, and refers to the hardware operating under the control of the operating system. Further, if the operating system is unnecessary and the hardware is operated solely by an application program, the hardware corresponds to the computer. The hardware includes at least a microprocessor such as a CPU (Central Processing Unit) and means for reading a computer program recorded in a recording medium. In the present embodiment, the SAS expander 12 has the function of a computer.

The information acquisition request output unit (discovery process execution unit) 2 outputs a discovery command (information acquisition request) to a lower-level SAS expander 12 connected to the SAS expander 12 corresponding to the information acquisition request output unit 2, to thereby perform the discovery process (information gathering process).

Specifically, the information acquisition request output unit 2 transmits commands, such as REPORT GENERAL (RPT_GENERAL), DISCOVER, and REPORT ROUTE INFORMATION (RPT_RT_INFO), for example, to the SMP 122 of the lower-level SAS expander 12.

Herein, REPORT GENERAL is a command for inquiring of a SAS expander 12 whether or not the SAS expander 12 is in the self-configuring state and the number of PHYs included in the SAS expander 12. For example, if a lower-level SAS expander 12 is in the self-configuring state, the lower-level SAS expander 12 sends a higher-level SAS expander 12 a response including the value of CONFIGURING=1.

The response from the lower-level SAS expander 12 responding to the REPORT GENERAL command also includes the number of PHYs.

DISCOVER is a command issued to a SAS expander 12, the PHY connection state of which is desired to be found. The SAS expander 12 having received the DISCOVER command transmits, as a response, the information of a device directly connected to a PHY of the SAS expander 12 having received the command (e.g., whether the connected device is a storage device 20 or a SAS expander 12).

REPORT ROUTE INFORMATION is a command for acquiring the connection state of a device connected to a subordinate SAS expander 12. The SAS expander 12 having received the REPORT ROUTE INFORMATION command transmits, as a response, not the information of a device directly connected to a PHY of the SAS expander 12 having received the command but the connection information of all devices connected under the SAS expander 12.

Further, if it is found as a result of measurement by the later-described timer 3 that the information gathering process has not completed, i.e., there is no response from the lower-level SAS expander 12 even after the lapse of a predetermined time since the output of the information acquisition request, the information acquisition request output unit 2 again outputs the information acquisition request.

The timer 3 measures the time elapsed since the output of the information acquisition request by the information acquisition request output unit 2. Upon start of the discovery process, the processor (discovery state checking unit) 121 starts monitoring the discovery state, and the elapsed time is measured by the timer 3. Then, every time a predetermined time elapses since the start of the discovery process, the processor 121 checks the state of the PHY connected to the target SAS expander 12. The function of the timer 3 can be realized by the use of a variety of known methods, and detailed description thereof will be omitted.

The retry counter control unit 5, which counts the number of outputs of the information acquisition request by the information acquisition request output unit 2, counts the number of information acquisition requests sent to the same SAS expander 12 (the number of retries). That is, the retry counter control unit 5 counts the number of retries of the discovery process. Further, the result of counting by the retry counter control unit 5 is stored in a retry counter (counter) 51 as the counter value. Further, the retry counter 51 is stored in, for example, a predetermined area of the memory 124.

On the basis of the respective responses from other SAS expanders 12 responding to the information acquisition request, the connection state management unit 4 manages the respective connection states of the other SAS expanders 12. Specifically, on the basis of the previously described state management table T1 (state information), the connection state management unit 4 manages the respective states of the PHYs, i.e., the respective states of the SAS expanders 12 connected the PHYs.

Further, if it is found as a result of measurement by the above-described timer 3 that the information gathering process has not completed even after the lapse of a predetermined time since the output of the information acquisition request, the connection state management unit 4 sets, in the PHY state of the state management table T1, "normal state" for another SAS expander 12, to which the information acquisition request has been sent. That is, if it is found as a result of measurement by the timer 3 that the information gathering process has not completed even after the lapse of a predetermined time since the output of the information acquisition request, the connection state management unit 4 makes a setting indicating the normal state of the another SAS expanders 12, to which the information acquisition request has been sent (deemed normal setting).

Further, the connection state management unit 4 compares the value of the retry counter 51 with a predetermined threshold value. Then, if it is detected that the value of the retry counter 51 has exceeded the threshold value, the connection state management unit 4 sets, in the PHY state of the state management table T1, "normal state" for the another SAS expander 12, to which the information acquisition request has been sent.

With the PHY state of the state management table T1 thus set as "normal state," it is possible to complete the discovery process of the SAS expander 12. Further, it is thereby possible to perform the discovery process also in the higher-level SAS expander 12 and the controller 10. The recovery processing unit 6 recovers a SAS expander 12 subordinate to a PHY having discovery abnormality from the state of discovery abnormality. The recovery processing unit 6 reboots the SAS expander 12, for which the deemed normal setting has been made by the connection state management unit 4, to thereby recover the SAS expander 12.

Referring to recovery target information (detailed description thereof will be made later) stored in the memory 124 or the like, the recovery processing unit 6 determines the PHY (SAS expander 12) to be rebooted.

That is, the recovery processing unit 6 reboots the another SAS expander 12, which has not completed the information gathering process even after the lapse of a predetermined time since the output of the information acquisition request, to thereby recover the SAS expander 12. The recovery process of the SAS expander 12 performed by the recovery processing unit 6 will be described in detail later.

The state monitoring unit 7, which monitors the respective states of devices connected to the SAS expander 12, monitors the respective states of the PHYs 0 to 23 in the SAS expander 12. Then, on the basis of the result of monitoring, the state monitoring unit 7 updates the above-described state management table T1.

Figure 4:
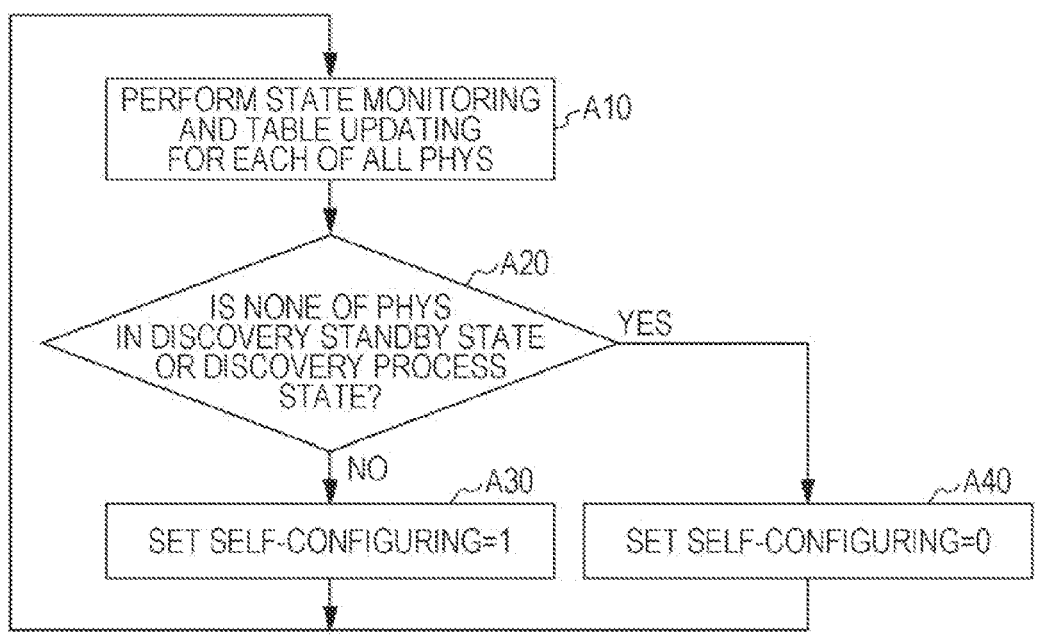
FIG. 4 is a flowchart for explaining a PHY monitoring method performed by a state monitoring unit in the storage system as an example of embodiment.

Herein, a PHY monitoring method performed by the state monitoring unit 7 in the storage system 1 as an example of embodiment will be described in accordance with the flowchart illustrated in FIG. 4 (Steps A10 to A40).

On the basis of the respective responses from the devices responding to the information acquisition request output by the information acquisition request output unit 2, the state monitoring unit 7 performs the monitoring of the PHY state and the updating of the state management table T1 for each of all PHYs 0 to 23 (Step A10).

Then, the state monitoring unit 7 checks whether or not all of the PHYs are in the "discovery standby" state or the "discovery process" state (Step A20). If none of the PHYs 0 to 23 is in the "discovery standby" state or the "discovery process" state (see the route of YES at Step A20), the state monitoring unit 7 sets a value "0" in the self-configuring flag section T1-2 of the state management table T1 (Step A40). That is, the PHYs 0 to 23 are all in the normal state or the connection standby state.

Meanwhile, if any of the PHYs 0 to 23 is in the "discovery standby" state or the "discovery process" state (see the route of NO at Step A20), the state monitoring unit 7 sets a value "1" in the self-configuring flag section T1-2 of the state management table T1 (Step A30). That is, the PHYs 0 to 23 are all in the self-configuring state.

Figure 5:
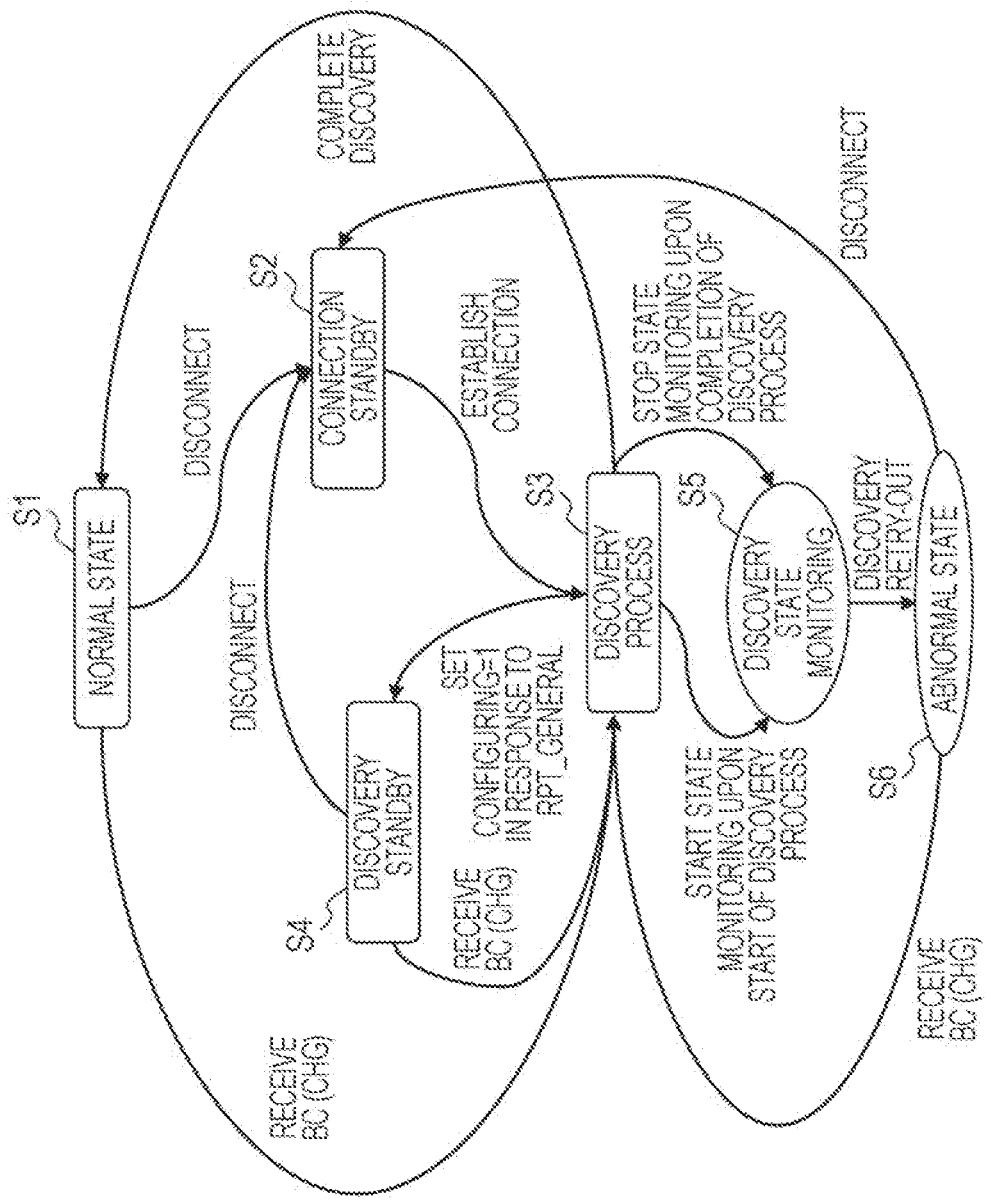
FIG. 5 is a diagram illustrating state transitions of a PHY of a SAS expander occurring in the storage system as an example of embodiment.

FIG. 5 is a diagram illustrating state transitions of a PHY of a SAS expander 12 (hereinafter occasionally referred to as the expander PHY) occurring in the storage system 1 as an example of embodiment.

In the normal state of the storage system 1 (see S1 in FIG. 5), if disconnection of a device is detected, the PHY shifts to the state of standby for the connection of the device (see S2 in FIG. 5). Upon establishment of connection of the device or receipt of the BC(CHG) in the normal state, the PHY shifts to the discovery process (see S3 in FIG. 5).

In the discovery process, if the response to the REPORT GENERAL command in the information acquisition request from the information acquisition request output unit 2 indicates the self-configuring state (CONFIGURING=1), the PHY shifts to the state of discovery standby (see S4 in FIG. 5). If the BC(CHG) is received in the discovery standby state, the PHY shifts to the discovery process state (see S3 in FIG. 5). Then, if the discovery process completes in the discovery process state, the PHY shifts to the normal state.

Further, in the discovery process state, discovery state monitoring by the state monitoring unit 7 starts upon start of the discovery process, and the PHY shifts to the discovery state monitoring state (see S5 in FIG. 5). The discovery state monitoring state stops upon completion of the discovery process.

Further, in the discovery state monitoring state, if the PHY remains in the discovery process state without a change in state thereof for a predetermined time, the discovery process is restarted. If the number of retries of the information acquisition request made by the information acquisition request output unit 2 has exceeded a predetermined value (discovery retry-out), the PHY shifts to the abnormal state (see S6 in FIG. 5).

That is, if the state of no change in the PHY state during the discovery process consecutively occurs a predetermined number of times after the restart of the discovery process, it is determined that there is abnormality in the PHY, a SAS expander 12 connected to the PHY, or the path therebetween, and the discovery process of the PHY is interrupted. Then, the discovery process is completed without the acquisition of the connection state of the device subordinate to the PHY.

Further, if, as a result of the discovery process, the PHY shifts to a BC(CHG) reception standby state owing to the self-configuring state of a subordinate SAS expander 12, and if the BC(CHG) is not received for a predetermined time since the start of the BC(CHG) reception standby state, the loss of the BC(CHG) is suspected, and the retry of the discovery process is performed on the subordinate SAS expander 12.

If the subordinate SAS expander 12 remains in the self-configuring state even after the retry of the discovery process, the PHY returns to the BC(CHG) reception standby state. If the subordinate SAS expander 12 remains in the self-configuring state even after a predetermined number of the retries, it is determined that there is abnormality in the PHY, the SAS expander 12 connected to the PHY, or the path therebetween. Then, the discovery process is interrupted, and the discovery process is completed without the acquisition of the connection state of the subordinate device.

With this configuration, even if there arises a situation in which the discovery process fails to complete, the failure to acquire the device connection state is limited to the device subordinate to the PHY having abnormality, and it is possible to acquire the respective connection states of normal parts higher than the PHY.

Further, if disconnection is detected in the abnormal state, the PHY shifts to the connection standby state (see S2 in FIG. 5). Meanwhile, if the BC(CHG) is received in the abnormal state, the PHY shifts to the discovery process (see S3 in FIG. 5).

The present storage system 1 grasps the state of the expander PHY by using the state monitoring unit 7 and the connection state management unit 4, and performs timer monitoring of the discovery process by using the timer 3. Thereby, the storage system 1 prevents the uncompleted state of the discovery process attributed to the stagnation of processing or the loss of the BC(CHG) during the discovery process.

Subsequently, processes performed in the respective states in the state transition diagram illustrated in FIG. 5 will be described in accordance with the flowcharts illustrated in FIGS. 6 to 10.

Figure 6:
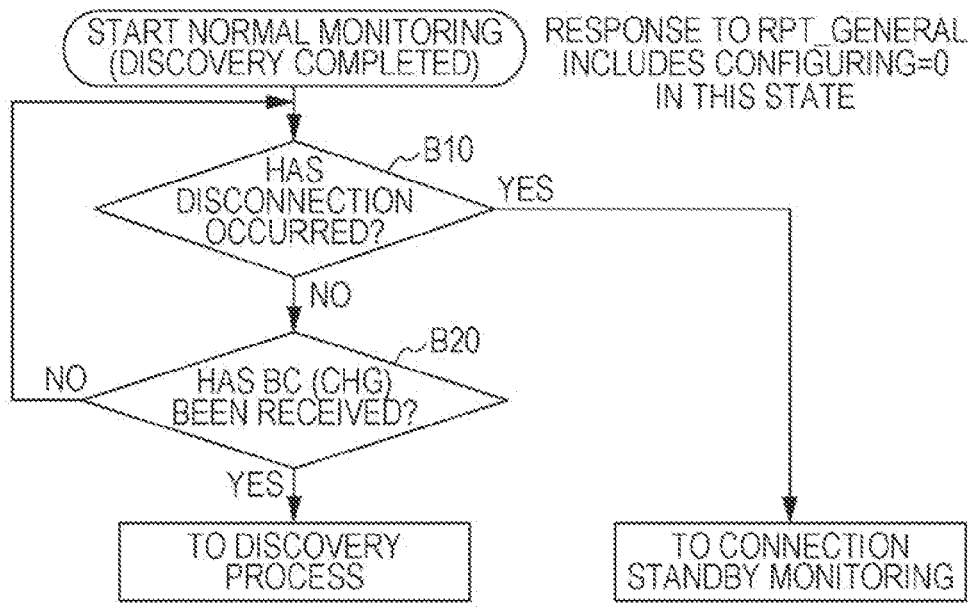
FIG. 6 is a flowchart for explaining processes performed in the respective states in the state transition diagram illustrated in FIG. 5.

The process performed in the normal state (see 51 in FIG. 5) in the storage system 1 as an example of embodiment will be first described in accordance with the flowchart illustrated in FIG. 6 (Steps B10 and B20).

Upon completion of the discovery process, normal monitoring starts. In this state, the response to the information acquisition request (REPORT GENERAL) from the information acquisition request output unit 2 includes the value of CONFIGURING=0.

The state monitoring unit 7 checks whether or not disconnection has occurred (Step B10). Herein, if disconnection has occurred (see the route of YES at Step B10), the process shifts to the connection standby state (see S2 in FIG. 5).

Meanwhile, if disconnection has not occurred (see the route of NO at Step B10), whether or not the BC(CHG) has been received is then checked (Step B20). If the BC(CHG) has not been received (see the route of NO at Step B20), the process returns to Step B10. Meanwhile, if the BC(CHG) has been received (see the route of YES at Step B20), the process shifts to the discovery process (see S3 in FIG. 5).

Figure 7:
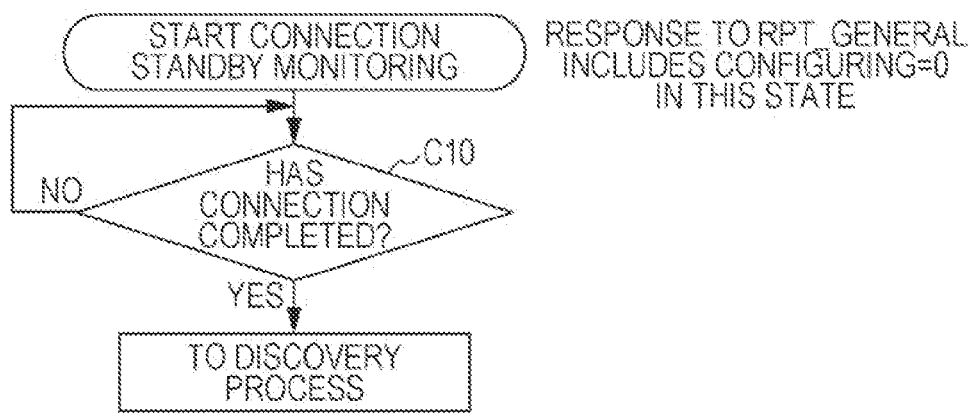
FIG. 7 is a flowchart for explaining processes performed in the respective states in the state transition diagram illustrated in FIG. 5.

Subsequently, the process performed in the connection standby state (see S2 in FIG. 5) in the storage system 1 as an example of embodiment will be described in accordance with the flowchart illustrated in FIG. 7 (Step C10).

Connection standby monitoring starts. In this state, the response to the information acquisition request (REPORT GENERAL) from the information acquisition request output unit 2 includes the value of CONFIGURING=0.

Then, whether or not the connection has completed is repeatedly checked (see Step C10 and the route of NO at Step C10). Then, if the connection has completed (see the route of YES at Step C10), and if the connected device is a SAS expander, the process shifts to the discovery process (see S3 in FIG. 5).

Figure 8:
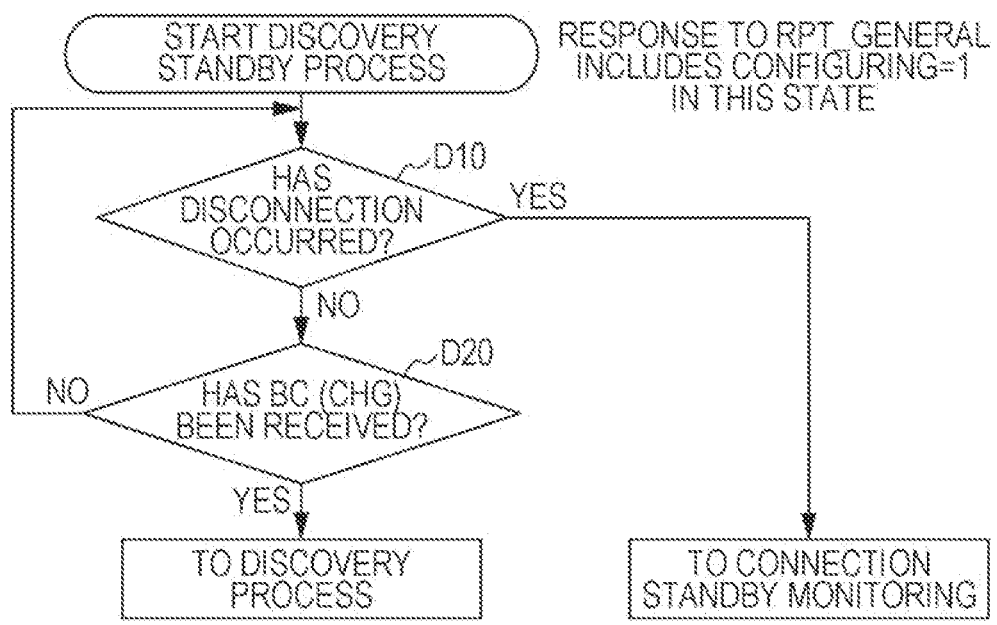
FIG. 8 is a flowchart for explaining processes performed in the respective states in the state transition diagram illustrated in FIG. 5.

Subsequently, the process performed in the discovery standby state (see S4 in FIG. 5) in the storage system 1 as an example of embodiment will be described in accordance with the flowchart illustrated in FIG. 8 (Steps D10 and D20).

In the discovery standby state, the response to the information acquisition request (REPORT GENERAL) from the information acquisition request output unit 2 includes the value of CONFIGURING=1.

The state monitoring unit 7 checks whether or not disconnection has occurred (Step D10). Herein, if disconnection has occurred (see the route of YES at Step D10), the process shifts to the connection standby state (see S2 in FIG. 5).

Meanwhile, if disconnection has not occurred (see the route of NO at Step D10), whether or not the BC(CHG) has been received is then checked (Step D20). If the BC(CHG) has not been received (see the route of NO at Step D20), the process returns to Step D10. Meanwhile, if the BC(CHG) has been received (see the route of YES at Step D20), the process shifts to the discovery process (see S3 in FIG. 5).

Figure 9:
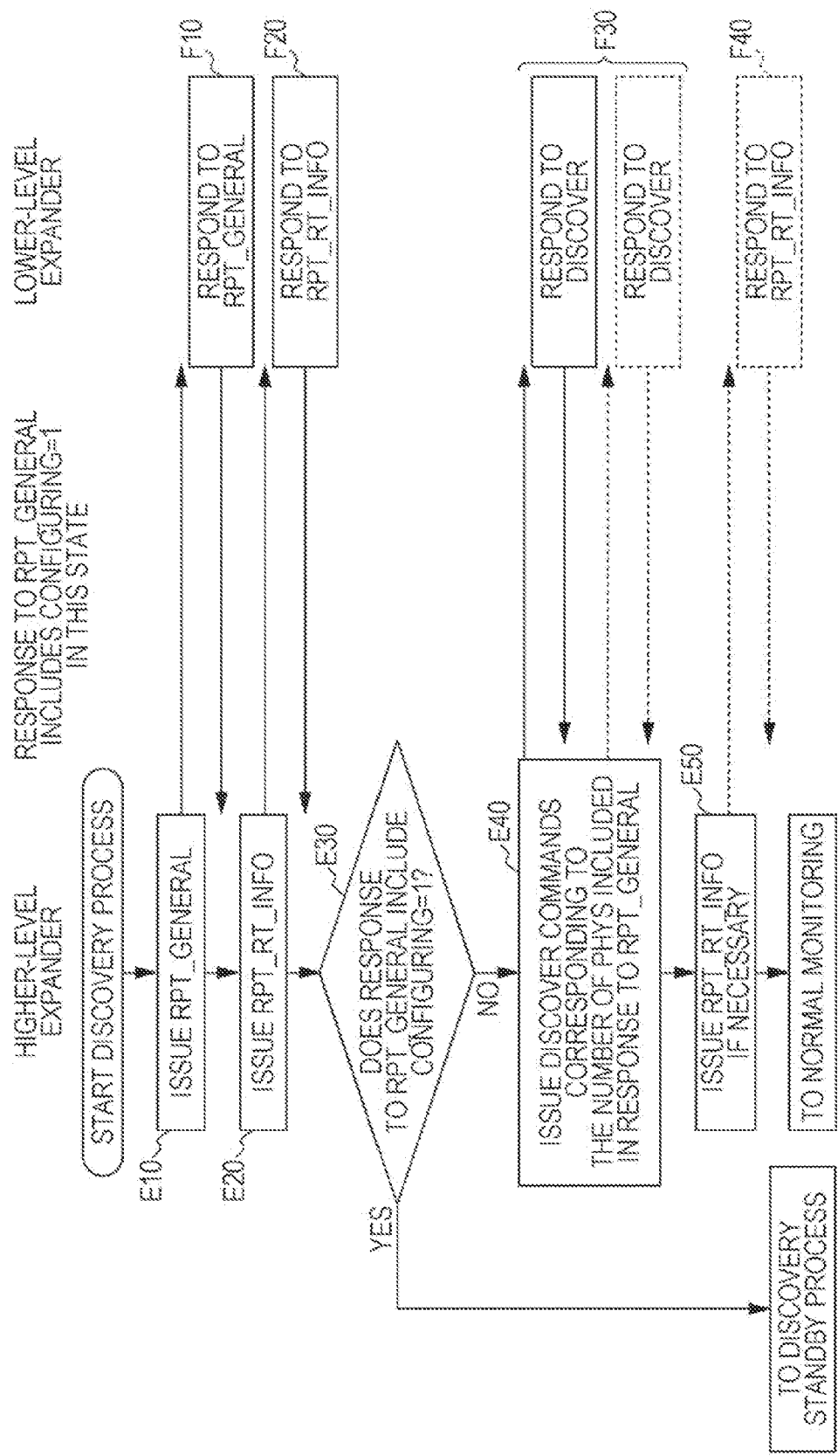
FIG. 9 is a flowchart for explaining processes performed in the respective states in the state transition diagram illustrated in FIG. 5.

Subsequently, the process performed in the discovery process state (see S3 in FIG. 5) in the storage system 1 as an example of embodiment will be described in accordance with the flowchart illustrated in FIG. 9 (Steps E10 to E50 and F10 to F40).

In the discovery process state, the response to the information acquisition request (REPORT GENERAL) from the information acquisition request output unit 2 includes the value of CONFIGURING=1.

In the discovery process, the information acquisition request output unit 2 of a higher-level SAS expander 12 issues the REPORT GENERAL command and the REPORT ROUTE INFORMATION command to a lower-level SAS expander 12 (Steps E10 and E20). The lower-level SAS expander 12 sends respective responses to the information acquisition requests (Steps F10 and F20). The response from the lower-level SAS expander 12 responding to the REPORT GENERAL command includes the number of PHYs included in the SAS expander 12.

The higher-level SAS expander 12 checks whether or not the response from the lower-level SAS expander 12 responding to the REPORT GENERAL command includes the value of CONFIGURING=1, i.e., whether or not the self-configuring is being performed (Step E30). If it is found as a result of checking that the response includes the value of CONFIGURING=1 (see the route of YES at Step E30), the process shifts to the state of discovery standby (see S4 in FIG. 5).

Meanwhile, if the response from the lower-level SAS expander 12 does not include the value of CONFIGURING=1, the information acquisition request output unit 2 issues, to the lower-level SAS expander 12, DISCOVER commands corresponding to the number of PHYs included in the response from the lower-level SAS expander 12 responding to the REPORT GENERAL command (Step E40).

The lower-level SAS expander 12 sends respective responses to all of the issued DISCOVER commands (Step F30).

Further, the higher-level SAS expander 12 issues, as required, the REPORT ROUTE INFORMATION command to the lower-level SAS expander 12 (Step E50). The lower-level SAS expander 12 sends a response to the REPORT ROUTE INFORMATION command (Step F40). Thereafter, the higher-level SAS expander 12 shifts to the normal monitoring state.

Figure 10:
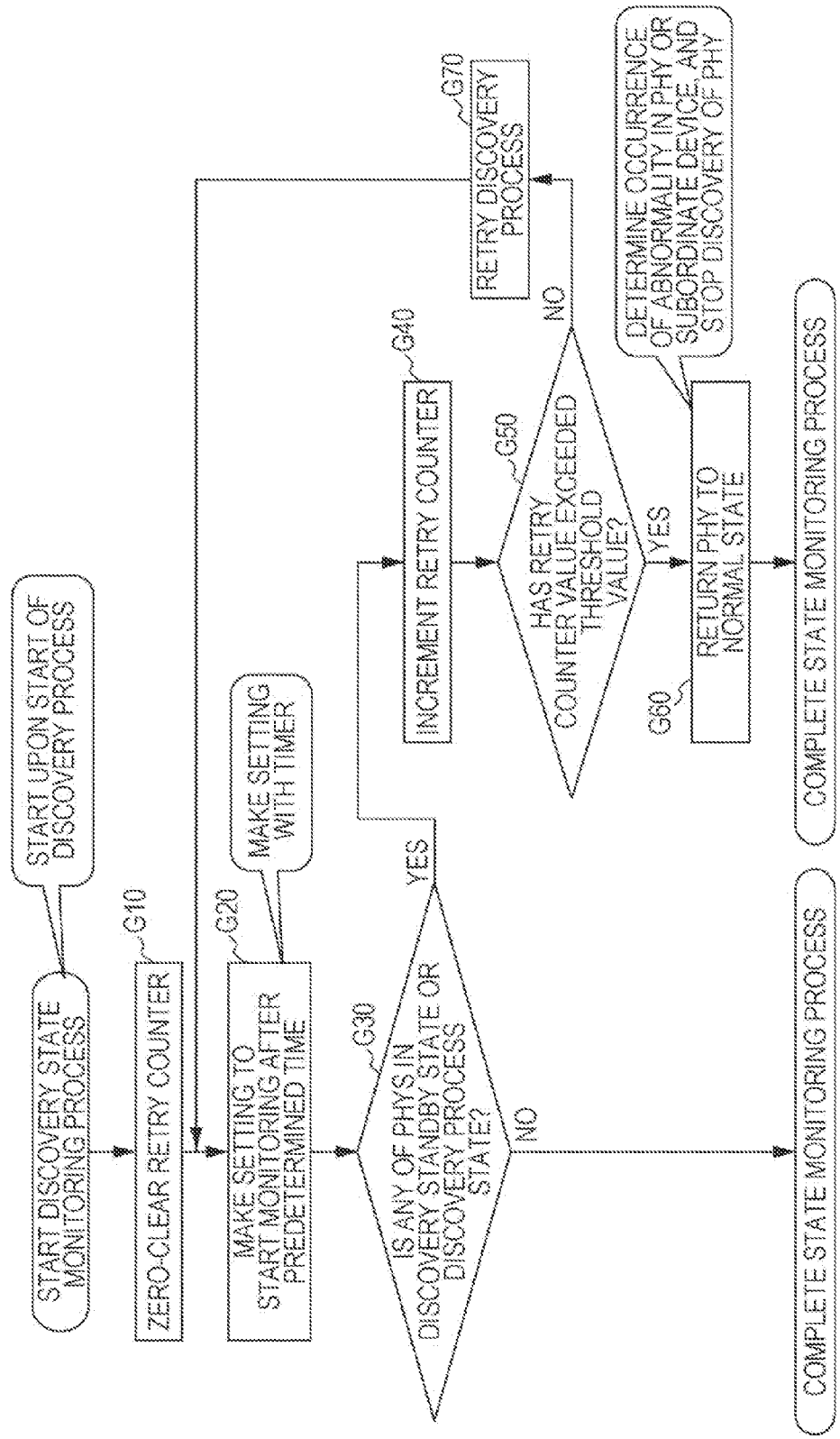
FIG. 10 is a flowchart for explaining processes performed in the respective states in the state transition diagram illustrated in FIG. 5.

Subsequently, the process performed in the discovery state monitoring state (see S5 in FIG. 5) in the storage system 1 as an example of embodiment will be described in accordance with the flowchart illustrated in FIG. 10 (Steps G10 to G70).

Upon start of the discovery process, the discovery state monitoring also starts. The retry counter control unit 5 first resets (zero-clears) the retry counter 51 (Step G10). Thereafter, a setting is made by the timer 3 so as to start the monitoring by the state monitoring unit 7 after a predetermined time (Step G20: timekeeping step). This setting can be achieved by, for example, a setting such as "START FUNCTION F AFTER N SECONDS."

Then, the state monitoring unit 7 monitors the respective states of the PHYs 0 to 23 in the SAS expander 12 to check whether or not any of the PHYs 0 to 23 is in the "discovery standby" state or the "discovery process" state (Step G30). Herein, if none of the PHYs 0 to 23 is in the "discovery standby" state or the "discovery process" state (see the route of NO at Step G30), the state monitoring process is completed.

Meanwhile, if any of the PHYs 0 to 23 is in the "discovery standby" state or the "discovery process" state (see the route of YES at Step G30), the retry counter control unit 5 increments the retry counter 51 (Step G40). Then, the connection state management unit 4 compares the value of the retry counter 51 with a predetermined threshold value (Step G50). If the value of the retry counter 51 has not exceeded the threshold value (see the route of NO at Step G50), the discovery process is retried (Step G70: information acquisition request output step), and thereafter the process returns to Step G20.

Meanwhile, if it is found as a result of comparison of the value of the retry counter 51 with the predetermined threshold value that the value of the retry counter 51 has exceeded the threshold value (see the route of YES at Step G50), the PHY state of the PHY in the state management table T1 is forcibly set to "normal state" (Step G60: connection state management step), and the state monitoring process is completed.

If the discovery process of the lower-level SAS expander 12 does not complete even if the discovery process is repeatedly performed more than the preset threshold number of times as a result of retry of the discovery process performed at every lapse of a predetermined time, it can be determined that some abnormality has occurred in the PHY or a device subordinate thereto. In the present storage system 1, the PHY value of the PHY in the state management table T1 is set to "normal state," to thereby create a state similar to the state in which the discovery process of the lower-level SAS expander 12 has completed. That is, the discovery process of the PHY is forcibly set to the completed state. Thereby, it is possible to complete the discovery process also in the higher-level SAS expander 12.

Upon completion of the discovery process, the execution of the monitoring process performed by the state monitoring unit 7 at every predetermined time at the above-described Step G20 is interrupted. That is, the timer 3 for regular monitoring is stopped.

Subsequently, the process performed when abnormality occurs during the discovery process in the above-configured storage system 1 as an example of embodiment will be described with reference to FIGS. 11 to 16. For the sake of convenience, these FIGS. 11 to 16 only illustrate one of the storage devices 20 and the SAS expanders 12*a* of the 0-system including, on the upstream side thereof, the controller 0, which will be used for explanation, and illustration of the other components is omitted. Further, it is needless to say that, although description will be made below with reference to the example of the controller 10a and the SAS expanders 12a forming the 0-system, similar processing is also performed in the 1-system including the controller 1 on the upstream side thereof.

Figure 11:
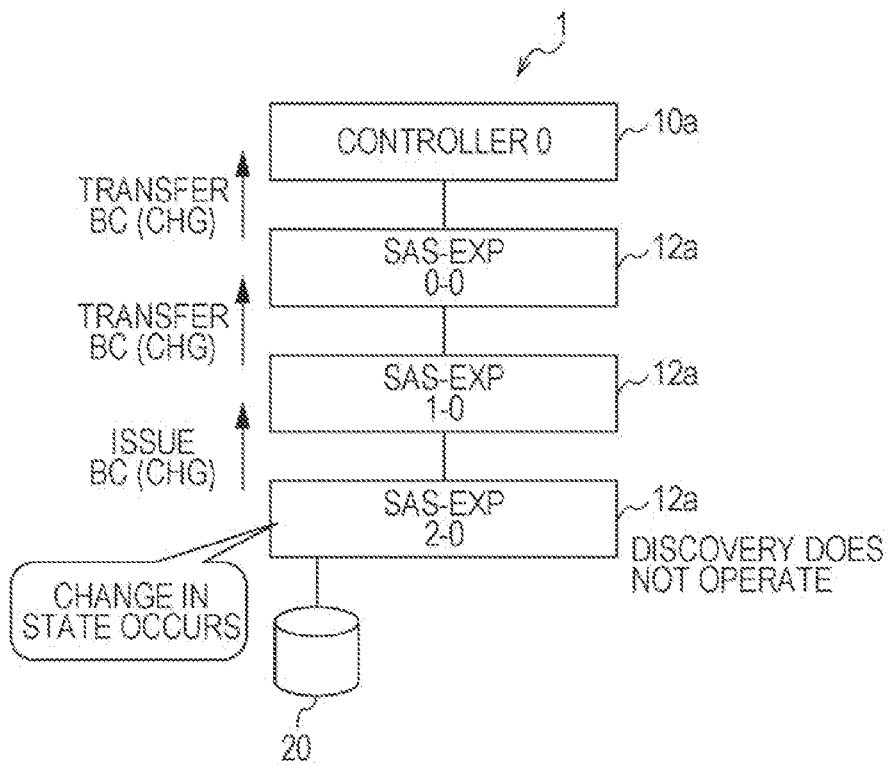
FIG. 11 is a diagram for explaining processing performed when abnormality occurs during a discovery process in the storage system as an example of embodiment.

In the storage system 1, as illustrated in FIG. 11, if the SAS expander 2-0 detects a change (change in state) in the topology managed thereby, for example, the SAS expander 2-0 issues the BC(CHG) to the higher-level SAS expander 1-0. In this case, the discovery process is not performed in the SAS expander 2-0.

The SAS expander 1-0 having received the BC(CHG) from the SAS expander 2-0 transfers the BC(CHG) to the further higher-level SAS expander 0-0, and the SAS expander 0-0 transfers the BC(CHG) to the further higher-level controller 0.

Figure 12:
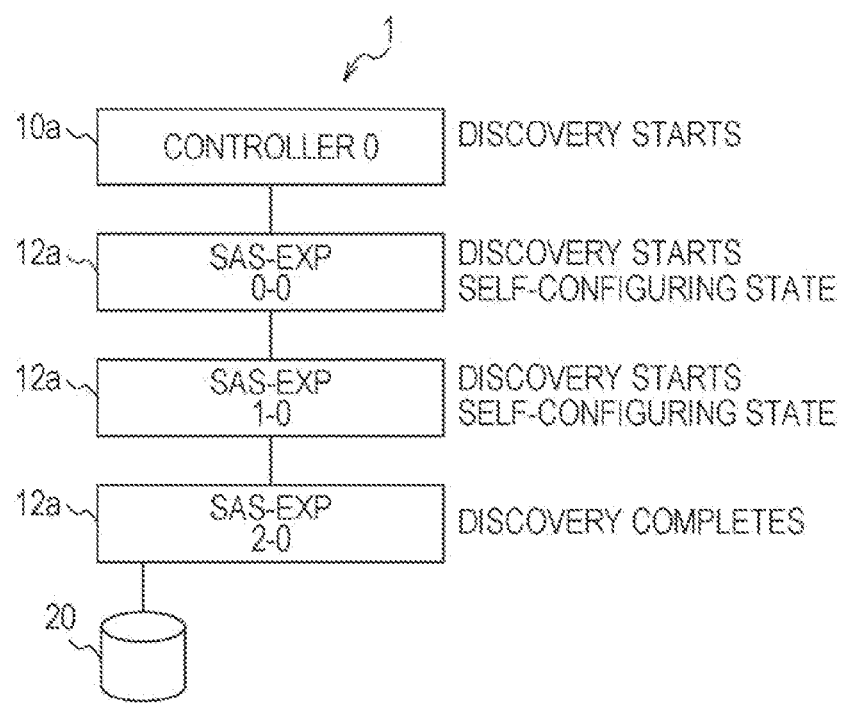
FIG. 12 is a diagram for explaining processing performed when abnormality occurs during a discovery process in the storage system as an example of embodiment.

Each of the controller 0 and the SAS expanders 0-0 and 1-0 having received the BC(CHG) starts the discovery process, as illustrated in FIG. 12. Accordingly, the SAS expanders 0-0 and 1-0 shift to the self-configuring state.

Figure 13:
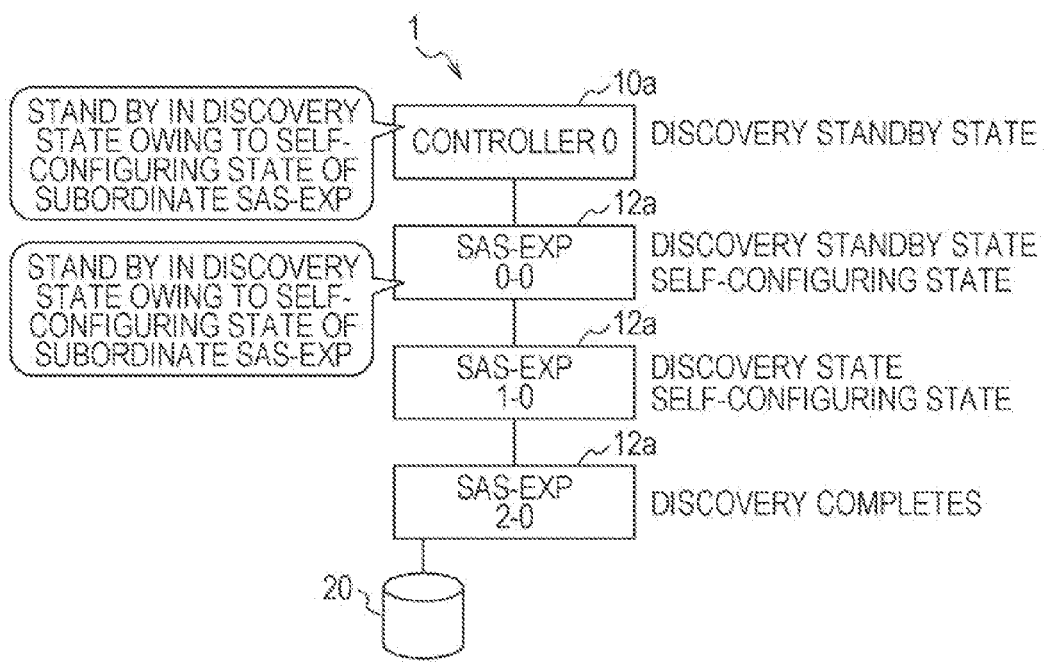
FIG. 13 is a diagram for explaining processing performed when abnormality occurs during a discovery process in the storage system as an example of embodiment.

Further, as illustrated in FIG. 13, the controller 0 and the SAS expander 0-0 are unable to proceed with the discovery process when the subordinate SAS expander 1-0 is in the discovery process state, and thus shift to the standby state (discovery standby state, self-configuring state). That is, the controller 0 and the SAS expander 0-0 stand by in the discovery state owing to the self-configuring state of the subordinate SAS expander 1-0.

Herein, if the discovery process of the SAS expander 1-0 completes, the SAS expander 1-0 issues the BC(CHG) to the higher-level SAS expander 0-0.

Figure 14:
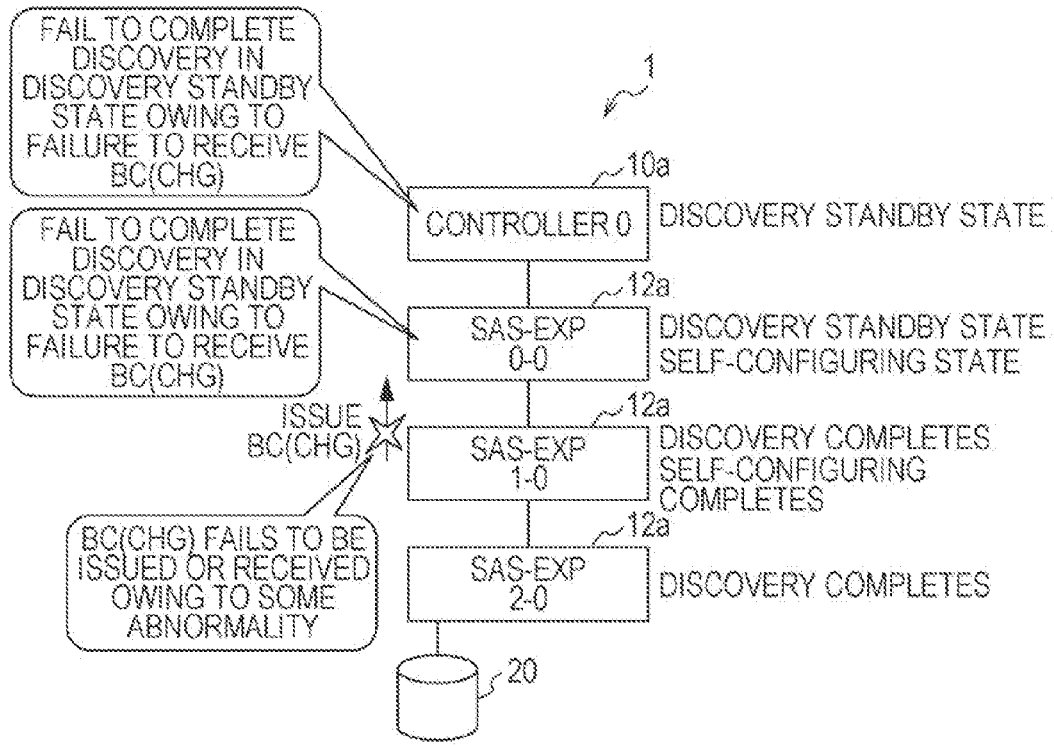
FIG. 14 is a diagram for explaining processing performed when abnormality occurs during a discovery process in the storage system as an example of embodiment.

As illustrated in FIG. 14, however, if the SAS expander 1-0 fails to issue the BC(CHG) or the SAS expander 0-0 fails to receive the issued BC(CHG) for some reason, the SAS expander 0-0 remains in the discovery standby state and is unable to complete the discovery process. Accordingly, the controller 0 also fails to receive the BC(CHG) and is unable to complete the discovery process, remaining in the discovery standby state.

In the present storage system 1, if the discovery process does not complete in the SAS expander 0-0 even after the lapse of a predetermined time since the start of the discovery process, the connection state management unit 4 interrupts the discovery process of the PHY having the uncompleted discovery process, to thereby forcibly complete the discovery process. Specifically, the information indicating "normal state" is set in the PHY information of the state management table T1 corresponding to the PHY having the uncompleted discovery process, even though the discovery process has not actually completed (deemed normal setting).

Figure 15:
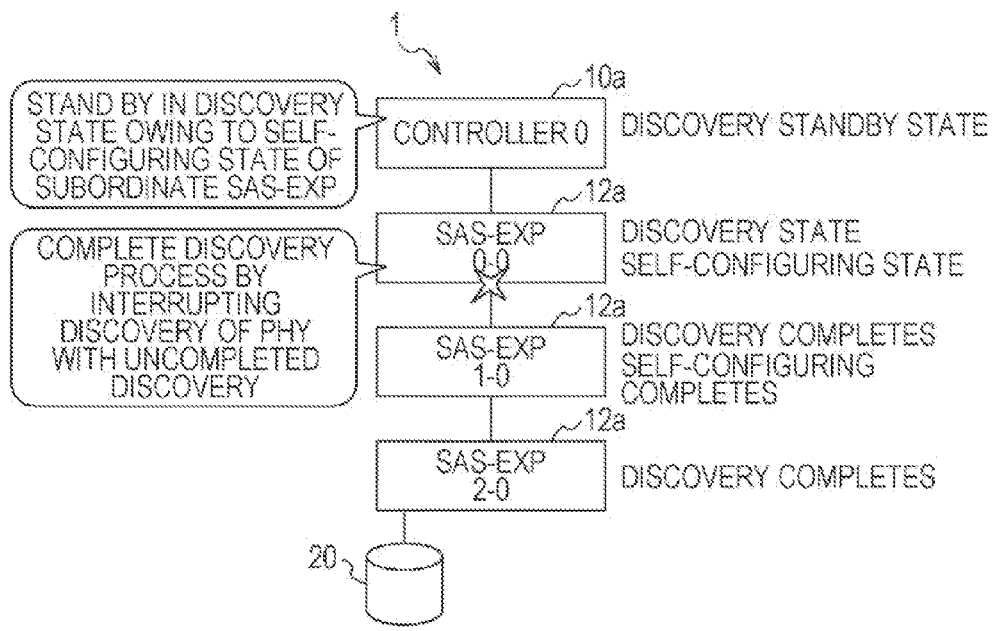
FIG. 15 is a diagram for explaining processing performed when abnormality occurs during a discovery process in the storage system as an example of embodiment.

Thereby, as illustrated in FIG. 15, the discovery process of the SAS expander 0-0 starts, and the SAS expander 0-0 shifts to the discovery state or the self-configuring state. In this state, the controller 0 still remains in the discovery standby state owing to the self-configuring state of the subordinate SAS expander 0-0.

Figure 16:
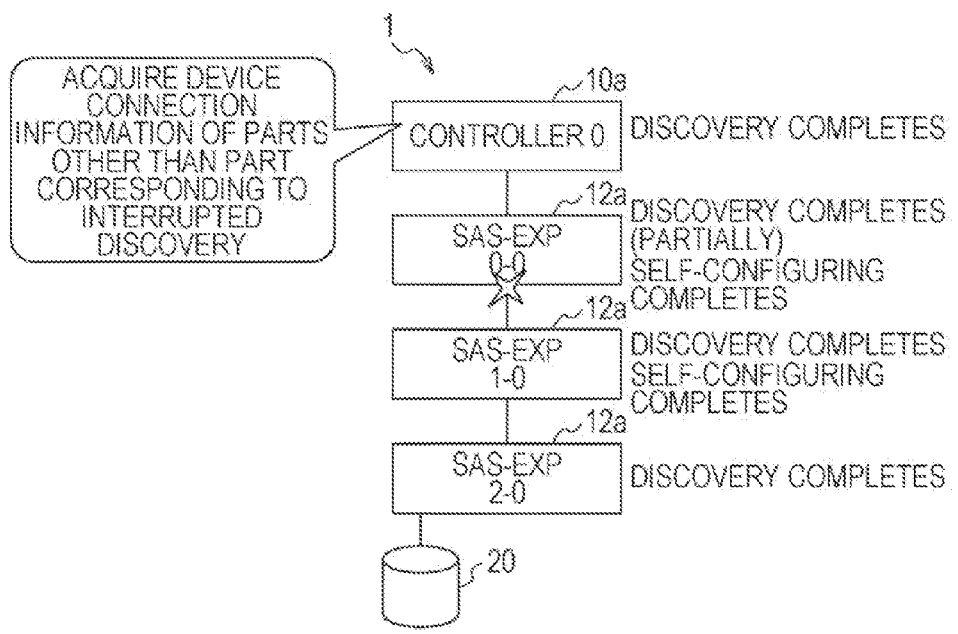
FIG. 16 is a diagram for explaining processing performed when abnormality occurs during a discovery process in the storage system as an example of embodiment.

Thereafter, as illustrated in FIG. 16, the discovery process is completed upon completion of the self-configuring of the SAS expander 0-0. Thereby, the discovery process is partially completed. That is, the discovery process of the SAS expander 1-0 has not actually completed, and thus the discovery process has formally completed in the SAS expander 0-0 without the acquisition of the information of a device subordinate to the SAS expander 1-0.

The controller 0 acquires discovery connection information of parts other than the part corresponding to the interrupted discovery process, and completes the discovery process. In this case, a device lower than the SAS expander 1-0 is not registered in the device map.

As described above, even if any of the SAS expanders 12 fails to complete the discovery process in the discovery process state, the resulting influence is limited to the extinction of a device lower than the SAS expander 1-0 from the device map, and it is possible to complete the discovery process without causing degrading of the CMs and so forth.

Subsequently, description will be made of a method in which the recovery processing unit 6 recovers a SAS expander 12 subordinate to a PHY having discovery abnormality as described above from the state of discovery abnormality.

The recovery processing unit 6 reboots the SAS expander 12 subordinate to a PHY having discovery abnormality, to thereby recover the SAS expander 12.

In the present storage system 1, the recovery processing unit 6 has at least one of (1) a recovery method using an SES (SCSI Enclosure Service) command, (2) a recovery method using a SAS link-down function, and (3) a recovery method using an external path.

(1) Recovery Method Using SES Command: FIGS. 17A to 17D are diagrams for explaining a SAS expander recovery method using an SES command performed in the storage system 1 as an example of embodiment.

For the sake of convenience, these FIGS. 17A to 17D only illustrate one controller 10 and two SAS expanders 12 cascade-connected thereto, and illustration of the other components is omitted. In these FIGS. 17A to 17D, one of the two SAS expanders 12 connected to the controller 10 will be referred to as the SAS expander A, and the SAS expander 12 connected under the SAS expander A will be referred to as the SAS expander B.

Description will be made of an example in which the BC(CHG) from the SAS expander B fails to be delivered to the SAS expander A or the SAS expander B continues to have the value of CONFIGURING=1, as illustrated in FIG. 17A.

In this case, the connection state management unit 4 of the SAS expander A interrupts the discovery process of the PHY connected to the SAS expander B, as illustrated in FIG. 17B. Further, the controller 10 only acquires the connection state of the SAS expander A, and completes the discovery process.

Herein, as illustrated in FIG. 17C, the SAS expander A having interrupted the discovery process of the PHY suffering from the stagnant discovery process transmits, to the SAS expander B connected to the PHY suffering from the stagnant discovery process, the DISCOVER command in a sequence different from the sequence of the normal discovery process. On the basis of the response from the SAS expander B responding to the DISCOVER command, the SAS expander A acquires the device information of devices directly connected to the SAS expander B.

Herein, if the devices directly connected to the SAS expander B include an SSP (Serial SCSI Protocol) device, the SAS expander A transmits a reboot command (reset command) to the SSP device, to thereby reboot and recover the SAS expander B. The presence or absence of the SSP device can be determined by, for example, checking the information (flag) included in the response to the DISCOVER command to indicate whether or not the target PHY is a virtual PHY, or checking whether or not an INQUIRY command serving as a SCSI command includes the information indicating whether or not the target device is an SES device. The checking of the SSP device may be performed by the use of a variety of known methods.

As a result, the SAS expander B is rebooted. Then, as illustrated in FIG. 17D, if the self-configuring of the SAS expander B completes and the BC(CHG) is delivered from the SAS expander B to the SAS expander A, the connection state of the entire system can be acquired. That is, if the SAS expander B is rebooted and the discovery process performed by the SAS expander A after the reconnection of the PHY completes, the recovery of the SAS expander B completes, and the controller 10 can acquire the connection state of the entire system.

Figure 18:
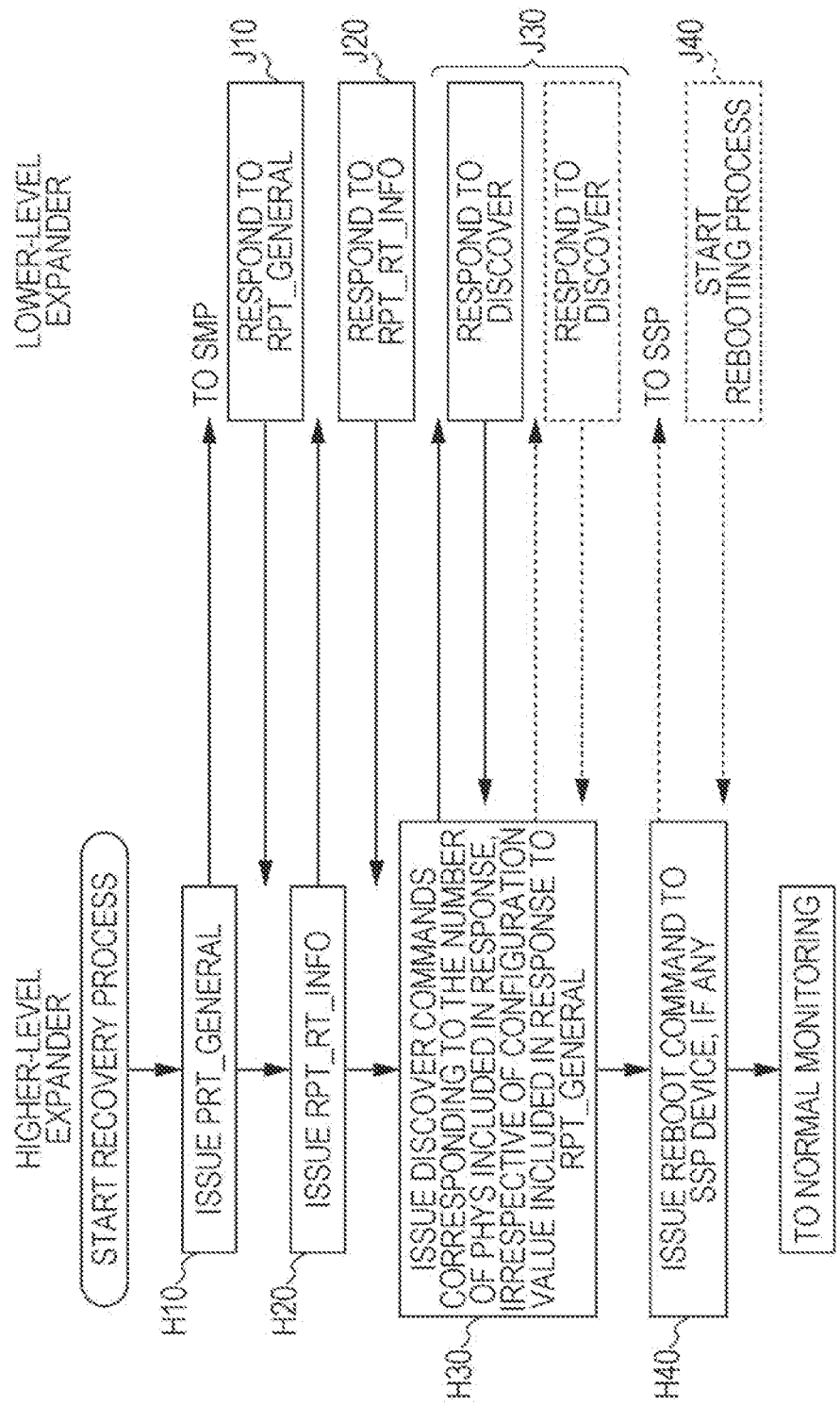
FIG. 18 is a flowchart for explaining a recovery method using an SES command performed by a recovery processing unit in the storage system as an example of embodiment.

Herein, a recovery method using an SES command performed by the recovery processing unit 6 in the storage system 1 as an example of embodiment will be described in accordance with the flowchart illustrated in FIG. 18 (Steps H10 to H40 and J10 to J40).

In the recovery process, the information acquisition request output unit 2 of a higher-level SAS expander 12 issues the REPORT GENERAL command and the REPORT ROUTE INFORMATION command to a lower-level SAS expander 12 (Steps H10 and H20). The lower-level SAS expander 12 sends respective responses to the information acquisition requests (Steps J10 and J20).

Irrespective of the configuration value included in the response from the lower-level SAS expander 12 responding to the REPORT GENERAL command, the higher-level SAS expander 12 issues DISCOVER commands corresponding to the number of PHYs included in the response from the lower-level SAS expander 12 responding to the REPORT GENERAL command (Step H30).

The lower-level SAS expander 12 sends respective responses to all of the issued DISCOVER commands (Step J30).

Then, if any of the responses to the DISCOVER commands indicates the presence of an SSP device, the higher-level SAS expander 12 issues a reboot command to the SSP device (Step H40). The lower-level SAS expander 12 including the SSP device having received the reboot command starts the rebooting process (Step J40).

As a result, the lower-level SAS expander 12 is rebooted. Then, if the discovery process performed by the higher-level SAS expander 12 after the reconnection of the PHY completes, the recovery of the lower-level SAS expander 12 completes, and the process shifts to the normal monitoring state (see S1 in FIG. 5).

(2) Recovery Method Using SAS Link-down Function: In the present storage system 1, the repeater 133 of the SAS expander 12 has a function of detecting SAS link-down and link-up. Further, the PLD 130 is configured to perform switch control of the switch 132 in accordance with the detection of link-down/link-up by the repeater 133 so as to control the power supply to the expander chip 120.

Specifically, the above-described power-off process of the expander chip 120 based on the SAS link-down detection can be achieved by, for example, expander firmware for operating the processor 121 of the SAS expander 12.

Further, the above-described power-on process of the expander chip 120 based on the SAS link-up detection can be achieved by, for example, a function of the PLD 130 of the SAS expander 12.

As described above, if the SAS expander 12 suffering from the stagnant discovery process has the link-down function for controlling the power supply to the expander chip 120 in accordance with the result of SAS link-down/link-up detection, it is possible to achieve recovery control using the link-down function.

FIGS. 19A to 19D are diagrams for explaining a SAS expander recovery method using the link-down function performed in the storage system 1 as an example of embodiment.

For the sake of convenience, these FIGS. 19A to 19D only illustrate one controller 10 and two SAS expanders 12 cascade-connected thereto, and illustration of the other components is omitted. In these FIGS. 19A to 19D, one of the two SAS expanders 12 connected to the controller 10 will be referred to as the SAS expander A, and the SAS expander 12 connected under the SAS expander A will be referred to as the SAS expander B.

Figure 19A:
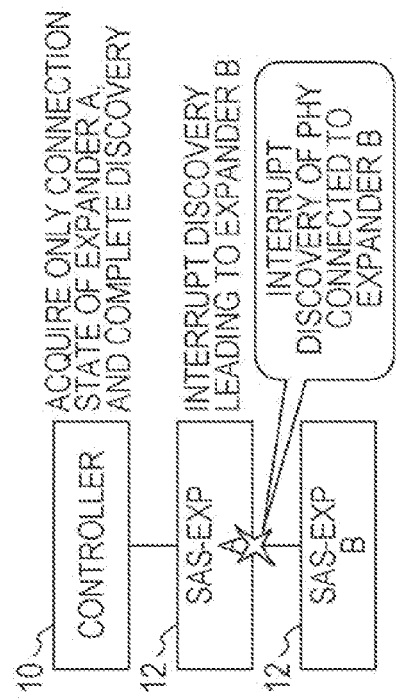
FIGS. 19A to 19D are diagrams for explaining a SAS expander recovery method using a link-down function performed in the storage system as an example of embodiment.

Description will be made of an example in which the BC(CHG) from the SAS expander B fails to be delivered to the SAS expander A or the SAS expander B continues to have the value of CONFIGURING=1, as illustrated in FIG. 19A.

Figure 19B:
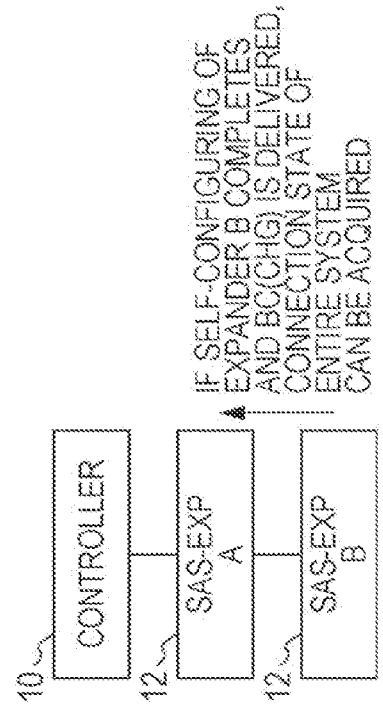

In this case, the connection state management unit 4 of the SAS expander A interrupts the discovery process of the PHY connected to the SAS expander B, as illustrated in FIG. 19B. Further, the controller 10 only acquires the connection state of the SAS expander A, and completes the discovery process.

Figure 19C:
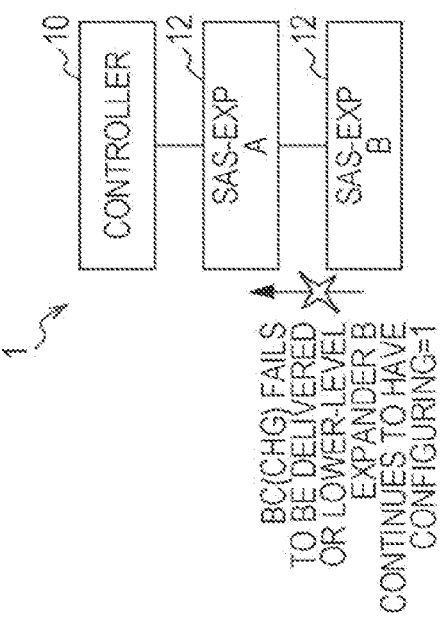

Herein, as illustrated in FIG. 19C, the SAS expander A having interrupted the discovery process of the PHY suffering from the stagnant discovery process disables, for a predetermined period, the PHY suffering from the stagnant discovery process, and thereafter enables the PHY. Thereby, the recovery processing unit 6 turns OFF and turns ON (reboots) the power supply of the connected SAS expander B to recover the SAS expander B.

Figure 19D:
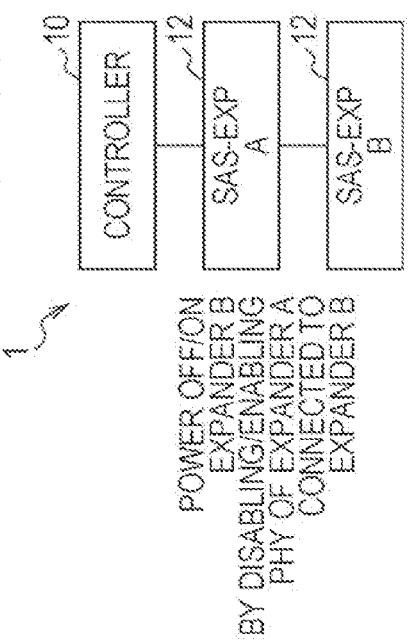

As s result, the SAS expander B is rebooted. Then, as illustrated in FIG. 19D, if the self-configuring of the SAS expander B completes and the BC(CHG) is delivered from the SAS expander B to the SAS expander A, the connection state of the entire system can be acquired. That is, if the SAS expander B is rebooted and the discovery process performed by the SAS expander A after the reconnection of the PHY completes, the recovery of the SAS expander B completes, and the controller 10 can acquire the connection state of the entire system.

(3) Recovery Method Using External Path: FIG. 20 is a diagram schematically exemplifying a configuration of the storage system 1 as an example of embodiment, which is capable of achieving a recovery method using an external path. FIG. 21 is a diagram schematically illustrating a hardware configuration of a SAS expander of the storage system 1.

To achieve the present recovery method using an external path, the storage system 1 is desired to have, for example, the hardware configuration as illustrated in FIGS. 20 and 21.

That is, as illustrated in FIG. 20, the controllers 10 and the SAS expanders 12 are communicably connected via a communication line (external path) 201 different from the data buses 18a, 18b, 19a-1, 19b-1, 19a-2, 19b-2, 19a-3, and 19b-3. The communication line 201 is based on, for example, an Ethernet (registered trademark) or serial standard.

As illustrated in FIG. 21, therefore, the expander chip 120 of each of the SAS expanders 12 includes a serial port 210 and an Ether port 220.

In the drawing, the same reference numerals as the previously described reference numerals designate components the same or substantially the same as the components designated by the previously described reference numerals, and thus description thereof will be omitted.

FIGS. 22A to 22D are diagrams for explaining a SAS expander recovery method using an external path performed in the storage system 1 as an example of embodiment.

For the sake of convenience, these FIGS. 22A to 22D only illustrate one controller 10 and two SAS expanders 12 cascade-connected thereto, and illustration of the other components is omitted. In these FIGS. 22A to 22D, one of the two SAS expanders 12 connected to the controller 10 will be referred to as the SAS expander A, and the SAS expander 12 connected under the SAS expander A will be referred to as the SAS expander B.

Description will be made of an example in which the BC(CHG) from the SAS expander B fails to be delivered to the SAS expander A or the SAS expander B continues to have the value of CONFIGURING=1, as illustrated in FIG. 22A.

In this case, the connection state management unit 4 of the SAS expander A interrupts the discovery process of the PHY connected to the SAS expander B, as illustrated in FIG. 22B. Further, the controller 10 only acquires the connection state of the SAS expander A, and completes the discovery process.

Herein, as illustrated in FIG. 22C, the SAS expander A having interrupted the discovery process of the PHY suffering from the stagnant discovery process transmits, via the communication line 201 not forming a SAS interface, a reboot command to the SAS expander B connected to the PHY suffering from the stagnant discovery process, to thereby reboot and recover the SAS expander B.

As a result, the SAS expander B is rebooted. Then, as illustrated in FIG. 22D, if the self-configuring of the SAS expander B completes and the BC(CHG) is delivered from the SAS expander B to the SAS expander A, the connection state of the entire system can be acquired. That is, if the SAS expander B is rebooted and the discovery process performed by the SAS expander A after the reconnection of the PHY completes, the recovery of the SAS expander B completes, and the controller 10 can acquire the connection state of the entire system.

The recovery of the SAS expander B may be performed such that the SAS expander A notifies the controller 10 of the malfunction of the SAS expander B via the data bus 18a, the communication line 201, or the like, and that the controller 10 transmits the reboot command to the SAS expander B via the communication line 201.

When the recovery processing unit 6 reboots the SAS expander 12 subordinate to the PHY having discovery abnormality to thereby recover the SAS expander 12, there may be a disk access from the host computer 200 or the like to a device subordinate to the SAS expander 12 being subjected to the rebooting process.

The present storage system 1 is desired to have a function of disguising the PHY having abnormal discovery as not implemented with a device during the above-described recovery process by the recovery processing unit 6.

FIG. 23 is a diagram illustrating another example of the state management table T1 as an example of embodiment. In the state management table T1 illustrated in this FIG. 23, "abnormal state (during recovery)" is set as the PHY state corresponding to a PHY ID of 2.

A method of responding to the DISCOVER command performed by a SAS expander 12 in the storage system 1 as an example of embodiment will be described in accordance with the flowchart illustrated in FIG. 24 (Steps L10 to L50).

A higher-level SAS expander 12 specifies the PHY ID and transmits the DISCOVER command to a lower-level SAS expander 12, and the lower-level SAS expander 12 receives the DISCOVER command (Step L10). The lower-level SAS expander 12 refers to the state management table T1, and checks whether or not the specified PHY is in the abnormal state (Step L20).

If the specified PHY is not in the abnormal state (see the route of NO at Step L20), the SAS expander 12 creates a response to the DISCOVER command by storing therein actual information (Step L30). Then, the SAS expander 12 transmits to the higher-level SAS expander 12 the created response to the DISCOVER command (Step L40), and the process is completed.

Meanwhile, if the specified PHY is in the abnormal state (see the route of YES at Step L20), the SAS expander 12 creates a response to the DISCOVER command indicating that the PHY is not implemented with a device (Step L50), and the process shifts to Step L40.

Herein, the method of creating a response to the DISCOVER command indicating that the PHY is not implemented with a device can be achieved by, for example, setting "No device attached (000b)" in the "ATTACHED DEVICE TYPE" field, setting "Unknown (0h)" in the "NEGOTIATED PHYSICAL LINK RATE" field, and setting "00b" in the "ATTACHED SATA PORT SELECTOR" and "ATTACHED SATA DEVICE" bits in the response to the DISCOVER command. These fields and bits are defined by the SAS standard, and detailed description thereof will be omitted.

Further, the method of creating a response to the DISCOVER command indicating that the PHY is not implemented with a device is not limited to the above-described method, and may be achieved by the use of a variety of other methods.

Further, when the recovery processing unit 6 reboots the SAS expander 12 subordinate to the PHY having discovery abnormality to thereby recover the SAS expander 12, the BC(CHG) is transmitted to a higher-level SAS expander 12 in accordance with the reboot of the SAS expander 12. Thereby, the discovery process starts, exerting influence on the processing of the storage system 1. To prevent such influence, the present storage system 1 has a function of preventing the issuance of the BC(CHG) in the recovery process by the recovery processing unit 6.

A BC(CHG) issuance method performed by a SAS expander 12 in the storage system 1 as an example of embodiment will be described in accordance with the flowchart illustrated in FIG. 25 (Steps M10 to M50).

If the state monitoring unit 7 of a SAS expander 12 detects a change in state of a PHY (Step M10), or if a SAS expander 12 receives the BC(CHG) from a lower-level SAS expander 12 connected to a PHY (Step M20), the connection state management unit 4 checks whether or not the PHY, the change in state of which has been detected, or from which the BC(CHG) has been received, is in the abnormal state (Step M30). The abnormal state of the PHY includes the "discovery standby during recovery" and the "discovery process state."

Then, if the PHY, the change in state of which has been detected, or from which the BC(CHG) has been received, is not in the abnormal state (see the route of NO at Step M30), the processor 121 issues the BC(CHG). Meanwhile, if the PHY, the change in state of which has been detected, or from which the BC(CHG) has been received, is in the abnormal state (see the route of YES at Step M30), the processor 121 prevents the issuance of the BC(CHG).

Figure 26:
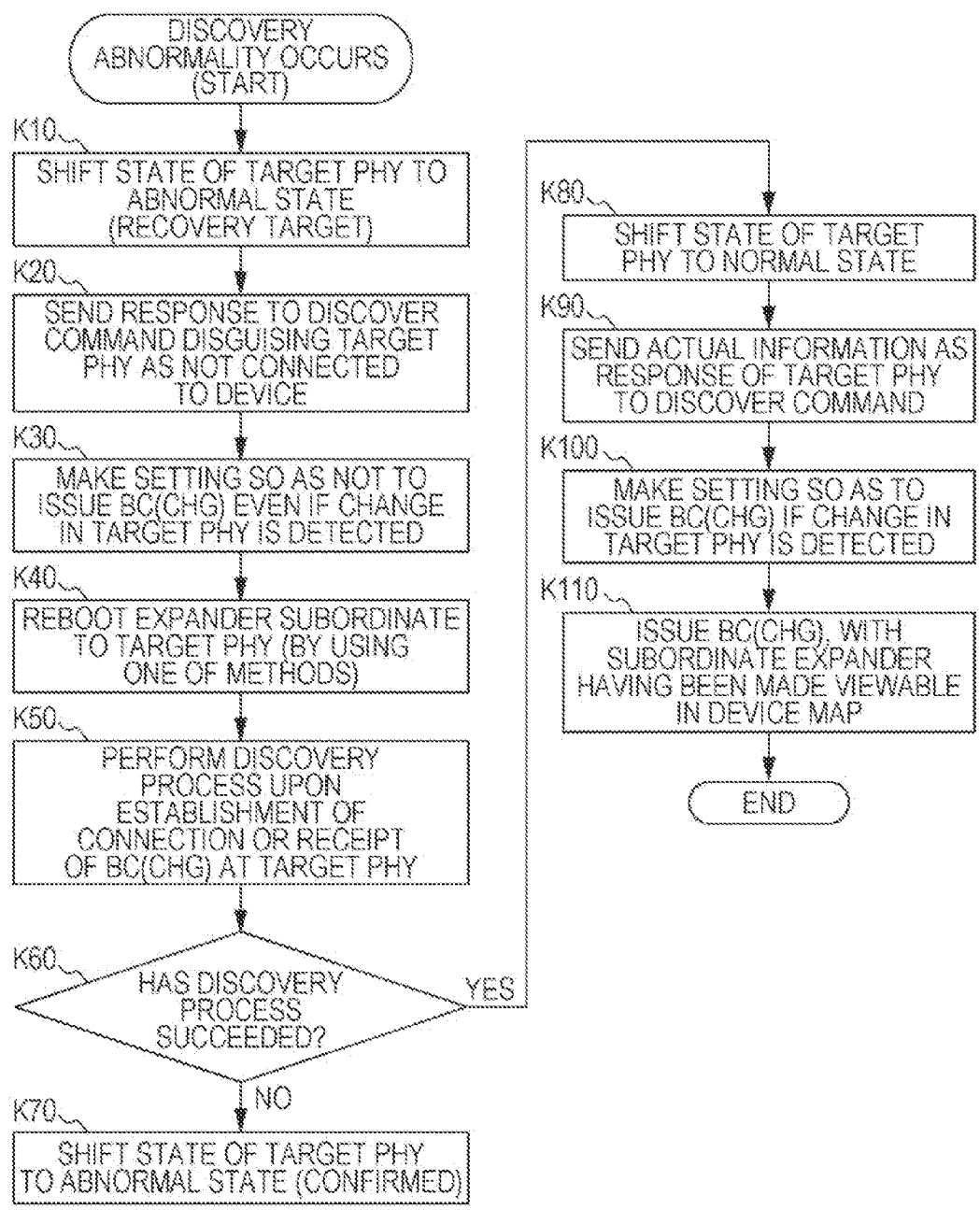
FIG. 26 is a flowchart for explaining a recovery process of recovering a SAS expander performed by another SAS expander in the storage system as an example of embodiment.

Subsequently, a recovery process of recovering the SAS expander B performed by the SAS expander A in the storage system 1 as an example of embodiment will be described in accordance with the flowchart illustrated in FIG. 26 (Steps K10 to K110).

If discovery abnormality occurs, the state monitoring unit 7 of the SAS expander A shifts (sets), in the state management table T1, the state of the PHY having the discovery abnormality (occasionally referred to as the target PHY) to the abnormal state (recovery target) (Step K10).

Further, the SAS expander A sends a response to the DISCOVER command disguising the target PHY as not connected to a device (Step K20). The SAS expander A further makes a setting so as not to issue the BC(CHG) even if a change in the target PHY is detected (Step K 30).

Thereafter, the recovery processing unit 6 of the SAS expander A reboots the SAS expander B subordinate to the target PHY (Step K40). In the recovery process, the recovery processing unit 6 may use one of (1) the recovery method using an SES command, (2) the recovery method using a SAS link-down function, and (3) the recovery method using an external path, which have been described above.

Upon establishment of connection or receipt of the BC(CHG) at the target PHY, the SAS expander A performs the discovery process (Step K50). Then, the SAS expander A checks whether or not the discovery process has succeeded (Step K60). If the discovery process has failed (see the route of NO at Step K60), the SAS expander A sets (shifts), in the state management table T1, the state of the target PHY to the abnormal state (confirmed) (Step K70), and the process is completed.

Meanwhile, if the discovery process has succeeded (see the route of YES at Step K60), the connection state management unit 4 shifts the PHY state of the target PHY to the normal state (Step K80).

Then, the SAS expander A sends actual information as the response of the target PHY to the DISCOVER command (Step K90). Further, the processor 121 is set to issue the BC(CHG) upon detection of a change in the target PHY (Step K100).

Thereafter, with the subordinate SAS expander 12 having been made viewable in the device map, the BC(CHG) is issued (Step K110), and the process is completed.

Figure 27:
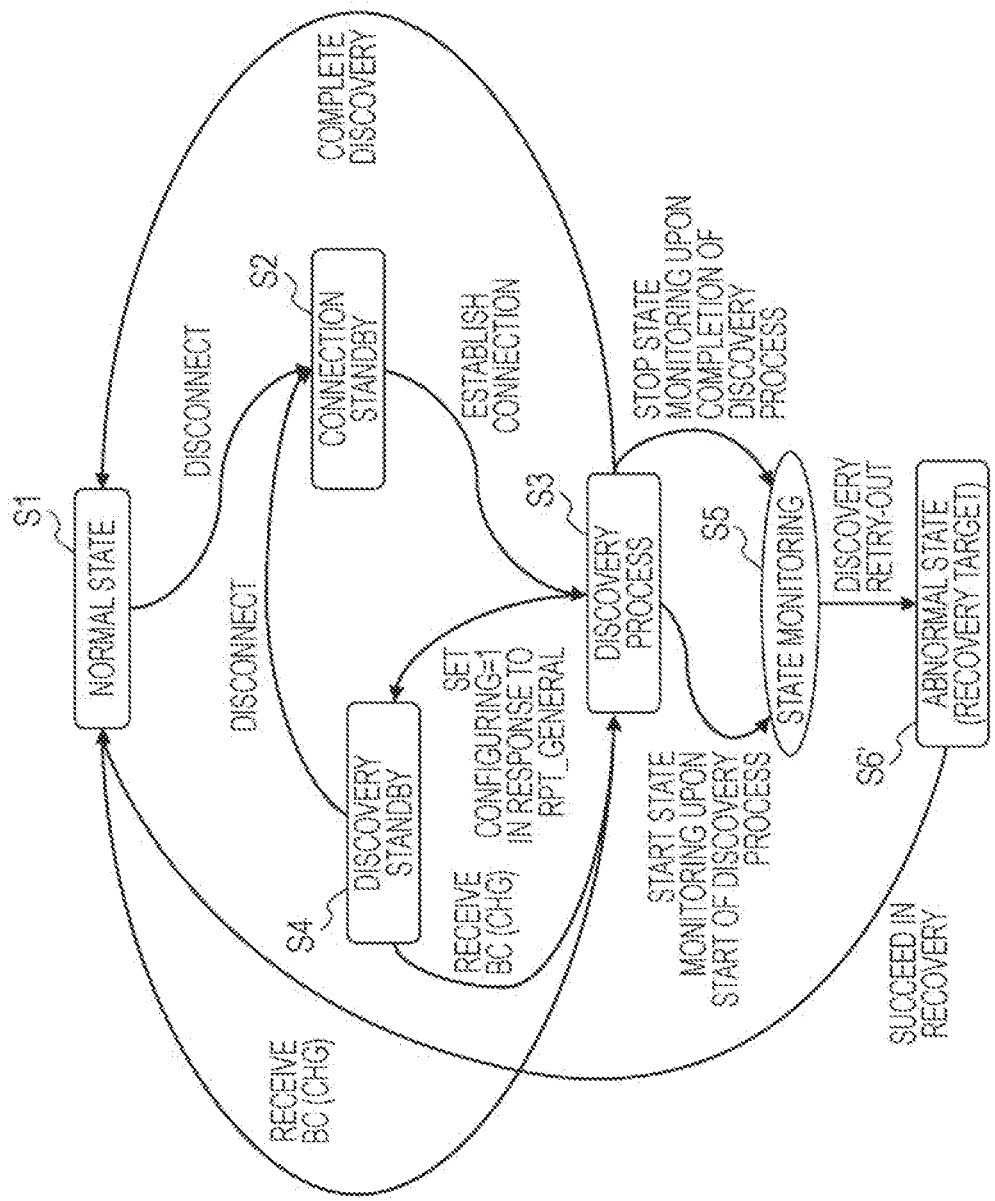
FIG. 27 is a diagram illustrating state transitions of an expander PHY occurring when the recovery process is implemented in the storage system as an example of embodiment.

FIG. 27 is a diagram illustrating state transitions of an expander PHY occurring when the recovery process is implemented in the storage system 1 as an example of embodiment. In the drawing, the same parts as the previously described parts represent the same or substantially the same processes, and thus description thereof will be omitted.

The state transition diagram illustrated in this FIG. 27 is different from the state transition diagram illustrated in FIG. 5 mainly in the process performed in the abnormal state (see S6' in FIG. 27). That is, if the number of retries of the information acquisition request made by the information acquisition request output unit 2 has exceeded a predetermined value (discovery retry-out), the PHY shifts to the abnormal state (recovery target) (see S6' in FIG. 27). In the abnormal state (recovery target), the connection state management unit 4 sets, for the PHY in which the abnormal state has been detected, the information indicating that the PHY is the recovery target (recovery target information).

The recovery target information is configured by, for example, identification information (e.g., flag) indicating the recovery target and associated with the PHY ID, and is stored in, for example, a predetermined area of the memory 124 or the like. With reference to the recovery target information, the recovery processing unit 6 determines the PHY to be subjected to the recovery process. That is, the recovery processing unit 6 determines, as the reboot (recovery) target, the SAS expander 12 connected to the PHY set with the identification information indicating the recovery target. Further, as illustrated in Step K80 in the flowchart of FIG. 26 described above, if the recovery has succeeded in the abnormal state (recovery target), the PHY shifts to the normal state (see S1 in FIG. 27).

Figure 28:
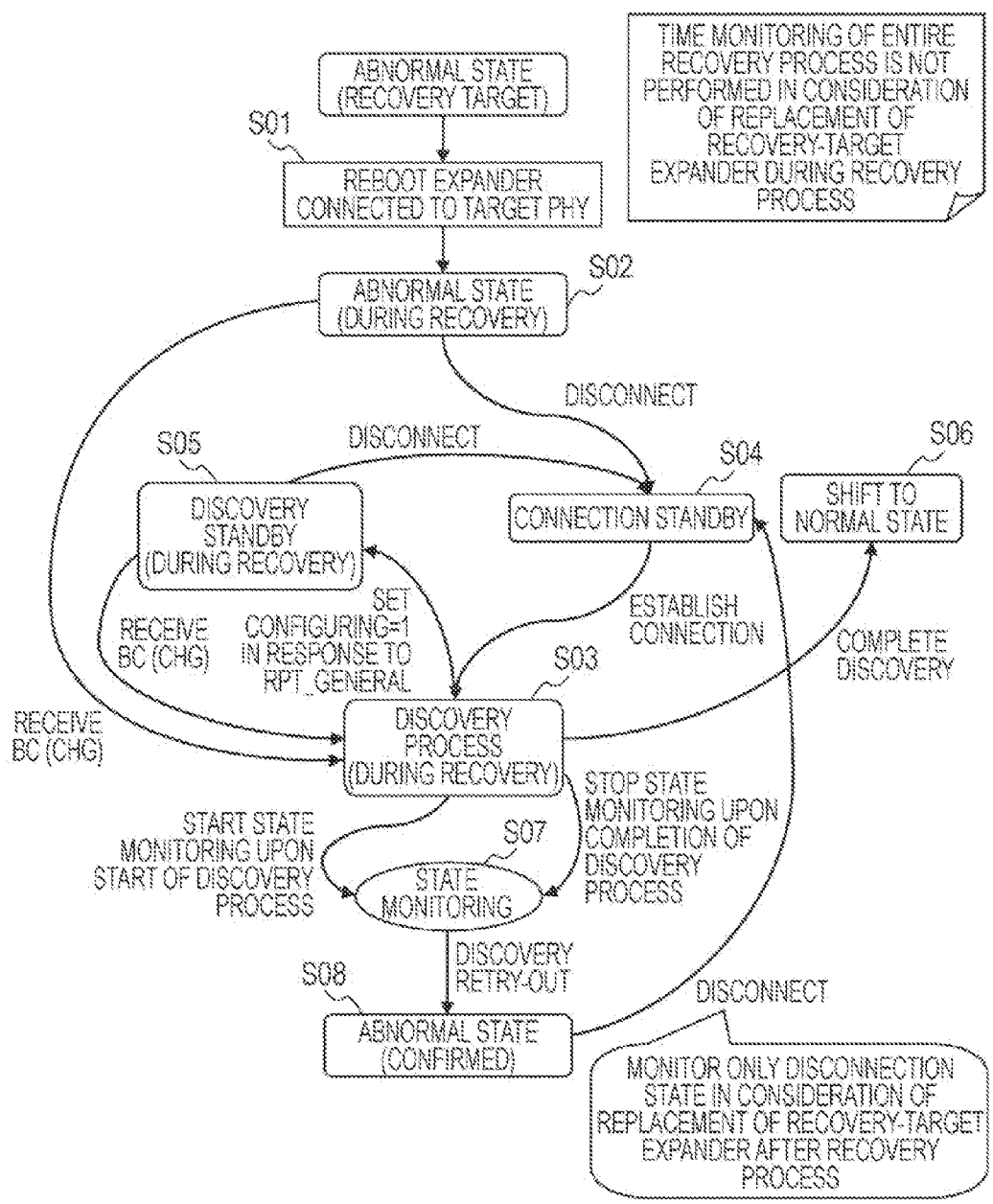
FIG. 28 is a diagram illustrating state transitions of a PHY in an abnormal state occurring in the storage system as an example of embodiment.
Figure 29:
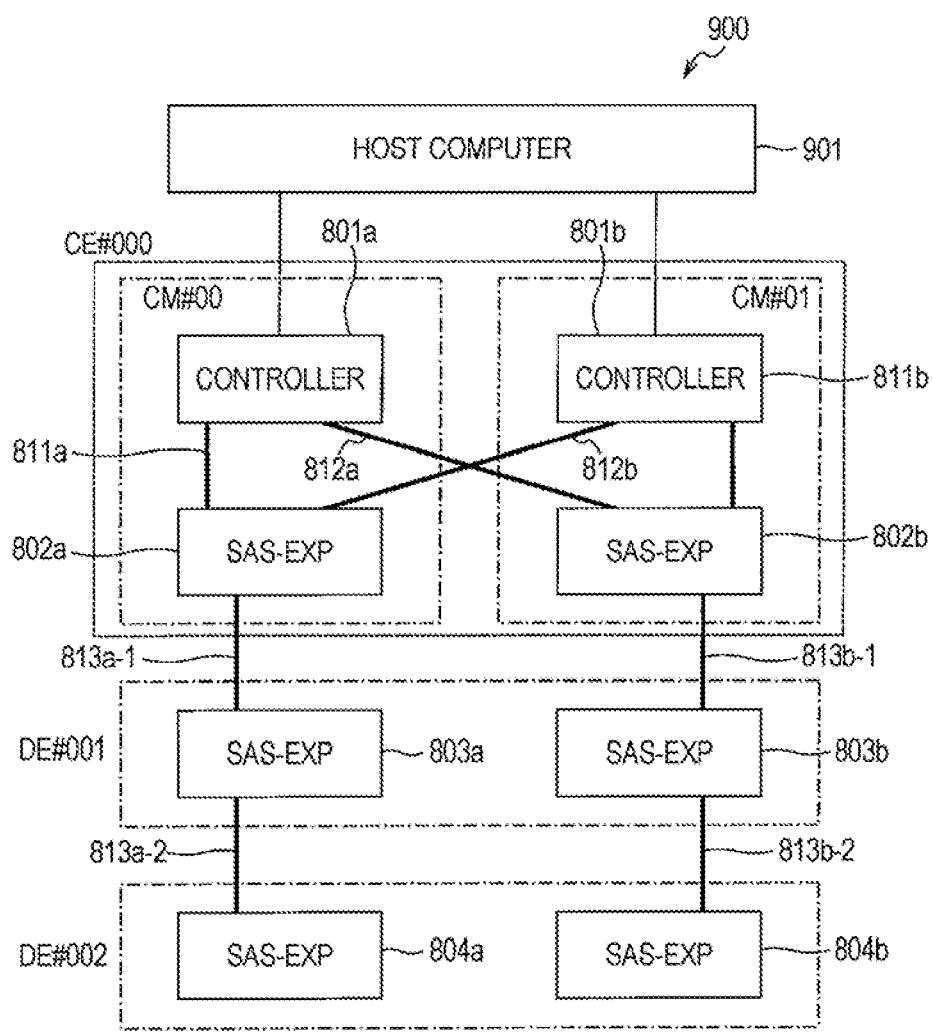
FIG. 29 is a diagram schematically illustrating a configuration of a storage system.
Figure 30:
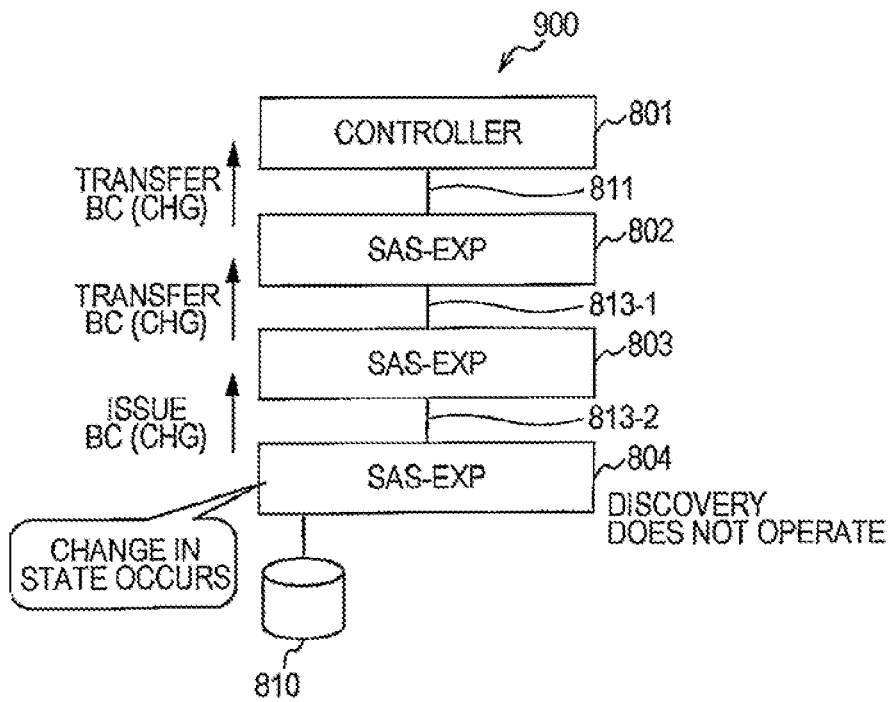
FIG. 30 is a diagram for explaining processing performed when abnormality occurs during a discovery process in an existing storage system.
Figure 31:
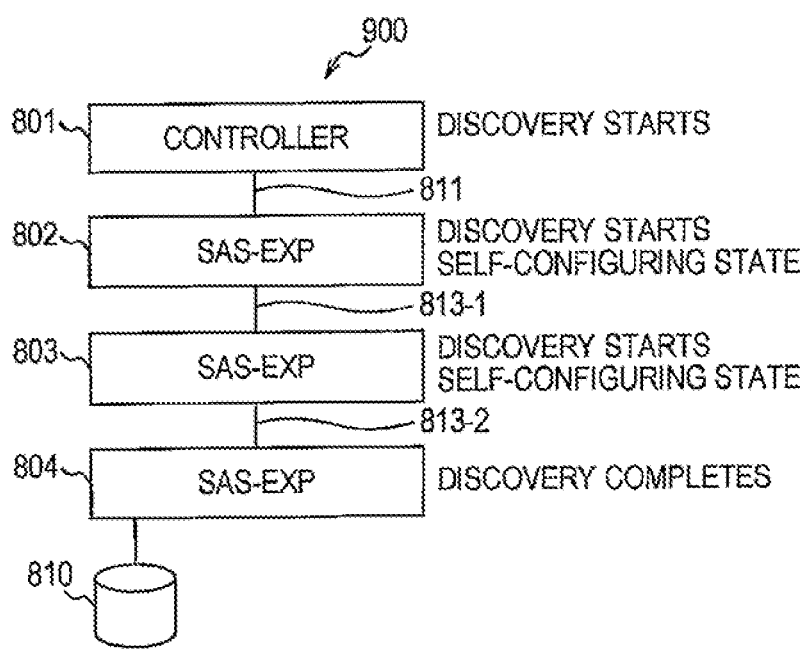
FIG. 31 is a diagram for explaining processing performed when abnormality occurs during a discovery process in an existing storage system.
Figure 32:
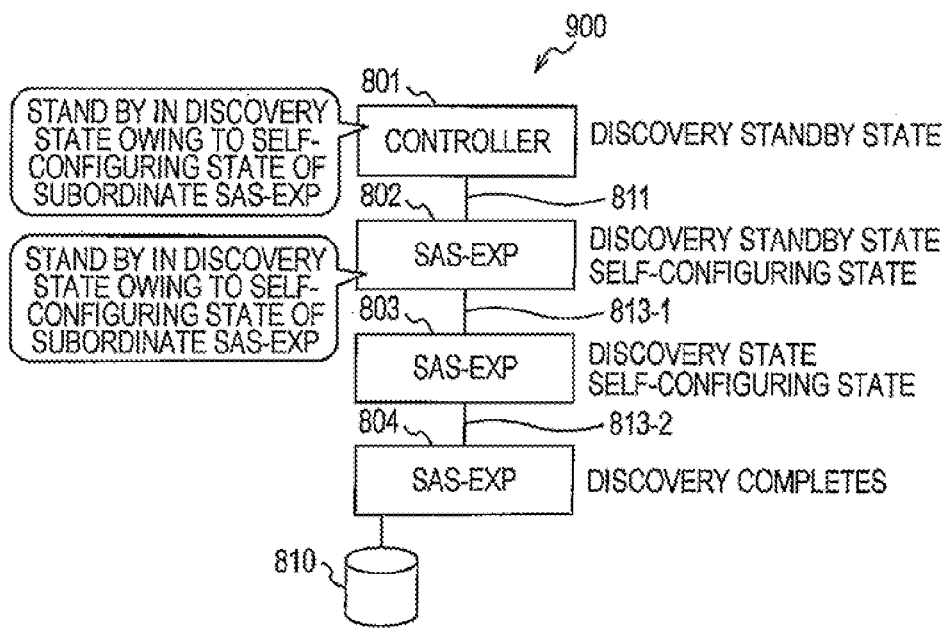
FIG. 32 is a diagram for explaining processing performed when abnormality occurs during a discovery process in an existing storage system.
Figure 33:
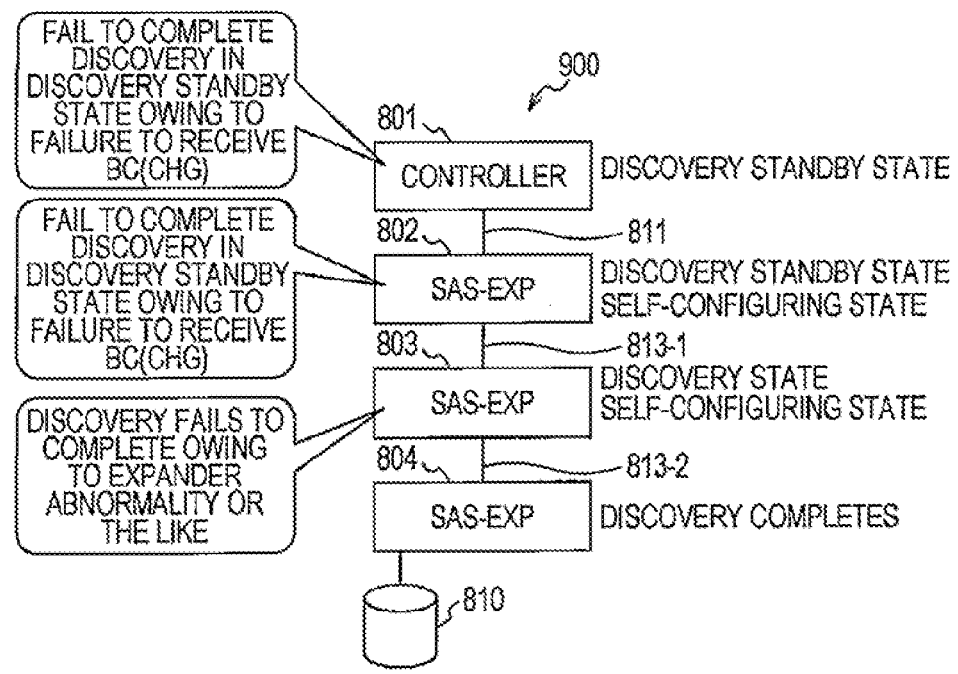
FIG. 33 is a diagram for explaining processing performed when abnormality occurs during a discovery process in an existing storage system.
Figure 34:
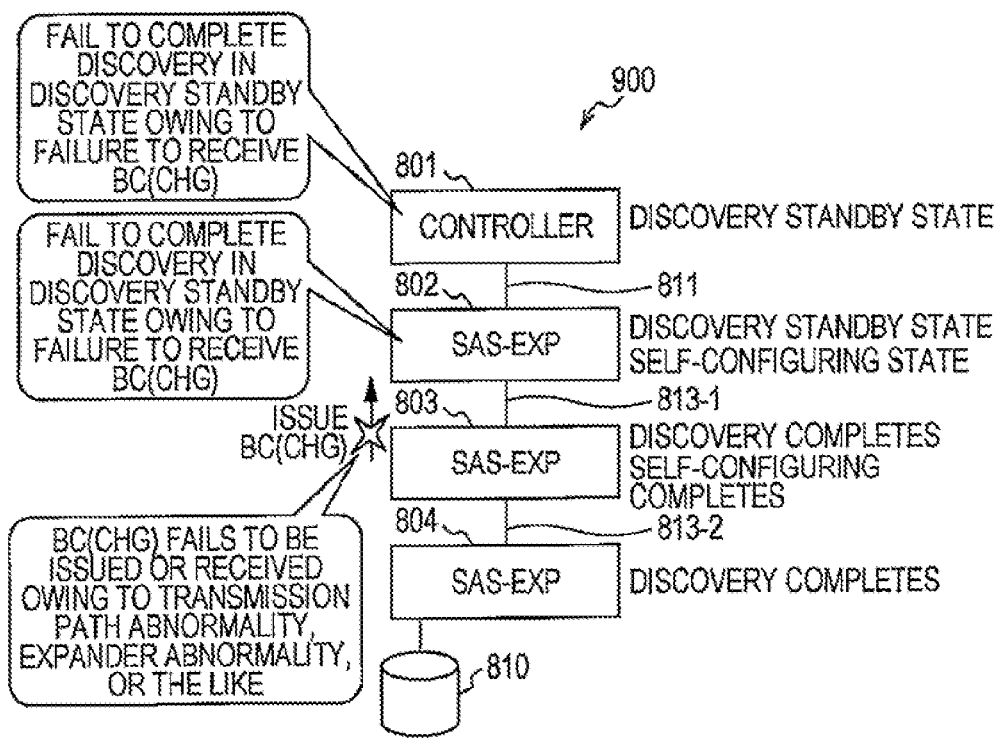
FIG. 34 is a diagram for explaining processing performed when abnormality occurs during a discovery process in an existing storage system.

FIG. 28 is a diagram illustrating state transitions of a PHY in the abnormal state occurring in the storage system 1 as an example of embodiment. In consideration of the replacement of the recovery-target SAS expander 12 during the recovery process, the time monitoring of the entire recovery process is not performed.

The recovery processing unit 6 reboots the SAS expander 12 connected to the target PHY in the abnormal state (recovery target) (see S01 in FIG. 28). Thereby, the state of the target PHY shifts to the abnormal state (during recovery) (see S02 in FIG. 28).

Herein, if the BC(CHG) from a lower-level SAS expander 12 is received in the abnormal state (during recovery), the state of the target PHY shifts to the discovery process (during recovery) (see S03 in FIG. 28). Further, if disconnection occurs in the abnormal state (during recovery) (see S02 in FIG. 28), the PHY shifts to the state of connection standby (see S04 in FIG. 28).

Then, if connection is established in the state of connection standby, the PHY shifts to the discovery process (during recovery) (see S03 in FIG. 28).

Further, if the value of CONFIGURING=1 is set in the response to the REPORT GENERAL command in the discovery process (during recovery), the state of the target PHY shifts to the state of discovery standby (during recovery) (see S05 in FIG. 28). Further, if the BC(CHG) is received in the state of discovery standby (during recovery), the state of the target PHY shifts to the discovery process (during recovery) (see S03 in FIG. 28). Further, if the discovery process completes in the discovery process (during recovery), the PHY shifts to the normal state (see S06 in FIG. 28).

Further, in the discovery process (during recovery) (see S03 in FIG. 28), the state monitoring starts upon start of the discovery process (see S07 in FIG. 28). The state monitoring stops upon completion of the discovery process.

Further, if the retry-out of the discovery process occurs in the state monitoring, the state of the target PHY shifts to the abnormal state (confirmed) (see S08 in FIG. 28). Then, if disconnection occurs in the abnormal state (confirmed), the PHY shifts to the state of connection standby (see S04 in FIG. 28). In consideration of the replacement of the recovery-target SAS expander 12 after the recovery process, only the disconnection state is monitored.

As described above, in the storage system 1 as an example of embodiment, if it is found as a result of measurement by the timer 3 that the discovery process has not completed even after the lapse of a predetermined time since the output of the discovery request, i.e., since the start of the discovery process, the connection state management unit 4 makes a setting, in the state management table T1, indicating the normal state (ordinary state) of the PHY having discovery abnormality (deemed normal setting). Thereby, the state of standby for the completion of the discovery process is canceled. Accordingly, it is possible to complete the discovery process, and to perform the discovery process also in a higher-level SAS expander 12 and the controller 10. That is, it is possible to stably operate the present storage system 1 without causing degrading of devices and so forth.

Therefore, even if there arises a situation in which the discovery process fails to complete, the resultant influence is limited to the failure to acquire the connection state of a device subordinate to the PHY having abnormality, and it is possible to acquire the respective connection states of normal parts higher than the PHY.

Further, if it is found as a result of measurement by the timer 3 that the discovery process has not completed even after the lapse of a predetermined time since the start of the discovery process, the discovery process is retried, and the count value of the retry counter 51 is compared with a predetermined threshold value. Then, if it is detected that the value of the retry counter 51 has exceeded the threshold value, the connection state management unit 4 makes a setting indicating the normal state (ordinary state) of the PHY having discovery abnormality. With the above-described threshold value set as appropriate, it is possible to operate the present storage system 1 in accordance with the intended purpose, such as the emphasis on stability or the emphasis on continuity of operations.

Further, the recovery processing unit 6 reboots the SAS expander 12 subordinate to the PHY having discovery abnormality, to thereby recover the SAS expander 12 from the state of discovery abnormality. It is therefore possible to stably operate the SAS expander 12 and a device connected thereto. Accordingly, it is possible to stably operate the present storage system 1, and to improve the reliability.

Further, the disclosed technique is not limited to the above-described embodiments, and can be implemented in various modified forms within a scope not departing from the gist of the present embodiments.

For example, the method performed by the recovery processing unit 6 to reboot the SAS expander 12 subordinate to the PHY having discovery abnormality is not limited to the above-described embodiments, and can be implemented in various modified forms. Further, the method performed by the recovery processing unit 6 to recover the SAS expander 12 is not limited to the rebooting of the SAS expander 12. For example, the SAS expander 12 may be recovered by a predetermined command transmitted thereto.

Further, in the above-described embodiments, the storage system 1 includes three DEs 30-1, 30-2, and 30-3. However, the configuration is not limited thereto, and the storage system 1 may include two DEs 30 or less, or may include four or more DEs 30.

Similarly, in the above-described embodiments, each of the CE 140 and the DEs 30 includes three storage devices 20. However, the configuration is not limited thereto, and each of the CE 140 and the DEs 30 may include two storage devices 20 or less, or may include four or more storage devices 20.

Further, the hardware configuration of the SAS expander 12 is not limited to the above-described embodiments, and may be implemented with, for example, the number of PHYs included in the expander chip 120 and so forth changed as required.

Further, it is possible for a person skilled in the art to implement and manufacture the present embodiments on the basis of the disclosure described above.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A storage expander apparatus for accessing a plurality of storage units, comprising:
    a plurality of first interfaces for accessing the plurality of storage units;
    a second interface for accessing subordinate expander apparatus; and
    a processor for executing:
    receiving from an external apparatus a first request for obtaining first information indicative of a state of a connection to be connected with the plurality of first interfaces and the second interface,
    transmitting a second request for obtaining second information indicative of a state of a connection of the subordinate expander apparatus,
    measuring an elapsing time that has elapsed since transmitting the second request,
    setting the state of the connection of the subordinate expander apparatus as a normal state upon the elapsing time exceeding a specified time without receiving a first response corresponding to the second request from the subordinate expander apparatus,
    starting a process for obtaining third information indicative of a state of a connection to be connected with the plurality of first interfaces upon the elapsing time exceeding a specified time without receiving the first response corresponding to the second request from the subordinate expander apparatus, and
    transmitting a second response including the third information to the external apparatus upon obtaining the third information.

2. The storage expander apparatus according to claim 1, wherein the processor further executes retransmitting the second request when the elapsing time exceeds a specified time.

3. The storage expander apparatus according to claim 2, wherein the processor further executes the starting when the number of times of the retransmitting is greater than specified times.

4. The storage expander apparatus according to claim 1, wherein the processor further executes managing information indicative of a state of the connection of the subordinate expander apparatus on the basis of the second response.

5. The storage expander apparatus according to claim 1, wherein the processor further executes transmitting a third request for executing a restarting process to the subordinate expander apparatus.

6. The storage expander apparatus according to claim 5, wherein the storage expander apparatus connects to the subordinate expander apparatus by using a Serial Attached Small Computer System Interface protocol.

7. The storage expander apparatus according to claim 6, wherein the third request requests turning on the power of the subordinate expander apparatus after turning off power of the subordinate expander apparatus.

8. A storage system comprising:
    a plurality of storage units; and
    a plurality of expander apparatuses for accessing the plurality of storage units, one of the plurality of expander apparatuses including:
    a plurality of first interfaces for accessing the plurality of storage units,
    a second interface for accessing subordinate expander apparatus of the plurality of expander apparatus, and
    a processor for executing:
    receiving from an external apparatus a first request for obtaining first information indicative of a state of a connection to be connected with the plurality of first interfaces and the second interface,
    transmitting a second request for obtaining second information indicative of a state of a connection of the subordinate expander apparatus, measuring an elapsing time that has elapsed since transmitting the second request, setting the state of the connection of the subordinate expander apparatus as a normal state upon the elapsing time exceeding a specified time without receiving a first response corresponding to the second request from the subordinate expander apparatus, starting a process for obtaining third information indicative of a state of a connection to be connected with the plurality of first interfaces upon the elapsing time exceeding a specified time without receiving the first response corresponding to the second request from the subordinate expander apparatus, and transmitting a second response including the third information to the external apparatus upon obtaining the third information.

9. The storage system according to claim 8, wherein the processor further executes retransmitting the second request when the elapsing time exceeds a specified time.

10. The storage system according to claim 9, wherein the processor further executes the starting when the number of times of the retransmitting is greater than specified times.

11. The storage system according to claim 8, wherein the processor further executes managing information indicative of a state of the connection of the subordinate expander apparatus on the basis of the second response.

12. The storage system according to claim 8, wherein the processor further executes transmitting a third request for executing a restarting process to the subordinate expander apparatus.

13. The storage system according to claim 12, wherein the storage expander apparatus connects to the subordinate expander apparatus by using a Serial Attached SCSI protocol.

14. The storage system according to claim 12, wherein the storage expander apparatus connects to the subordinate expander apparatus by using a Serial Attached Small Computer System Interface protocol.

15. A method of controlling an storage expander apparatus for accessing a plurality of storage units, the storage expander apparatus including a plurality of first interfaces for accessing the plurality of storage units and a second interface for accessing subordinate expander apparatus, the method comprising:

receiving from an external apparatus a first request for obtaining first information indicative of a state of a connection to be connected with the plurality of first interfaces and the second interface by the storage expander apparatus, transmitting a second request for obtaining second information indicative of a state of a connection of the subordinate expander apparatus by the storage expander apparatus, measuring an elapsing time that has elapsed since transmitting the second request, setting the state of the connection of the subordinate expander apparatus as a normal state upon the elapsing time exceeding a specified time without receiving a first response corresponding to the second request from the subordinate expander apparatus, starting a process for obtaining third information indicative of a state of a connection to be connected with the plurality of first interfaces upon the elapsing time exceeding a specified time without receiving the first response corresponding to the second request from the subordinate expander apparatus, and transmitting a second response including the third information to the external apparatus upon obtaining the third information by the storage expander apparatus.

* * * * *